(12) United States Patent
Matsumoto et al.

(10) Patent No.: US 6,643,430 B2
(45) Date of Patent: Nov. 4, 2003

(54) TEMPERATURE CONTROL SYSTEM FOR A GRATING

(75) Inventors: Sadayuki Matsumoto, Tokyo (JP); Takuya Ohira, Tokyo (JP); Masakazu Takabayashi, Tokyo (JP); Kiichi Yoshiara, Tokyo (JP); Shigeru Matsuno, Tokyo (JP); Hajime Takeya, Tokyo (JP); Junichiro Hoshizaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 155 days.

(21) Appl. No.: 09/891,334

(22) Filed: Jun. 27, 2001

(65) Prior Publication Data

US 2002/0114570 A1 Aug. 22, 2002

(30) Foreign Application Priority Data

Dec. 26, 2000 (JP) ........................................ 2000-395162

(51) Int. Cl.[7] .................................................. G02B 6/34
(52) U.S. Cl. ................................ 385/37; 385/31; 385/8
(58) Field of Search ............................ 385/2, 8, 12, 17, 385/31, 37, 123

(56) References Cited

U.S. PATENT DOCUMENTS 5,760,391 A * 6/1998 Narendran ............. 250/227.14
6,411,746 B1 * 6/2002 Chamberlain et al. ......... 385/2
6,522,812 B1 * 2/2003 Nikonov ....................... 385/37

FOREIGN PATENT DOCUMENTS

| JP | 10-221658 A | 8/1998 |
|---|---|---|
| JP | 2000-137197 A | 5/2000 |
| JP | 2000-244394 A | 8/2000 |

OTHER PUBLICATIONS

Sugihara et al.; "Adaptive dispersion compensation for 40 Gbit/s RZ transmission by using Bragg gratings", Fifth Optoelectronics and Communications Conf. (OECC 2000) *Technical Digest*, pp. 592–593, Jul. 2000.

* cited by examiner

*Primary Examiner*—Edward J. Glick
*Assistant Examiner*—Therese Barber
(74) *Attorney, Agent, or Firm*—Leydig, Voit & Mayer, Ltd.

(57) ABSTRACT

A temperature control device for controlling temperature variable devices disposed near a grating of a variable dispersion equalizer including an optical waveguide having the grating. The temperature variable devices control temperatures independently of each other. The temperature control device includes a controller for controlling the temperature variable units, and a storage device which stores temperature control patterns including combinations of control signals for the respective temperature variable units. The controller controls the temperature variable devices with a control signal of at least one of the temperature control patterns selected from the storage device.

15 Claims, 17 Drawing Sheets

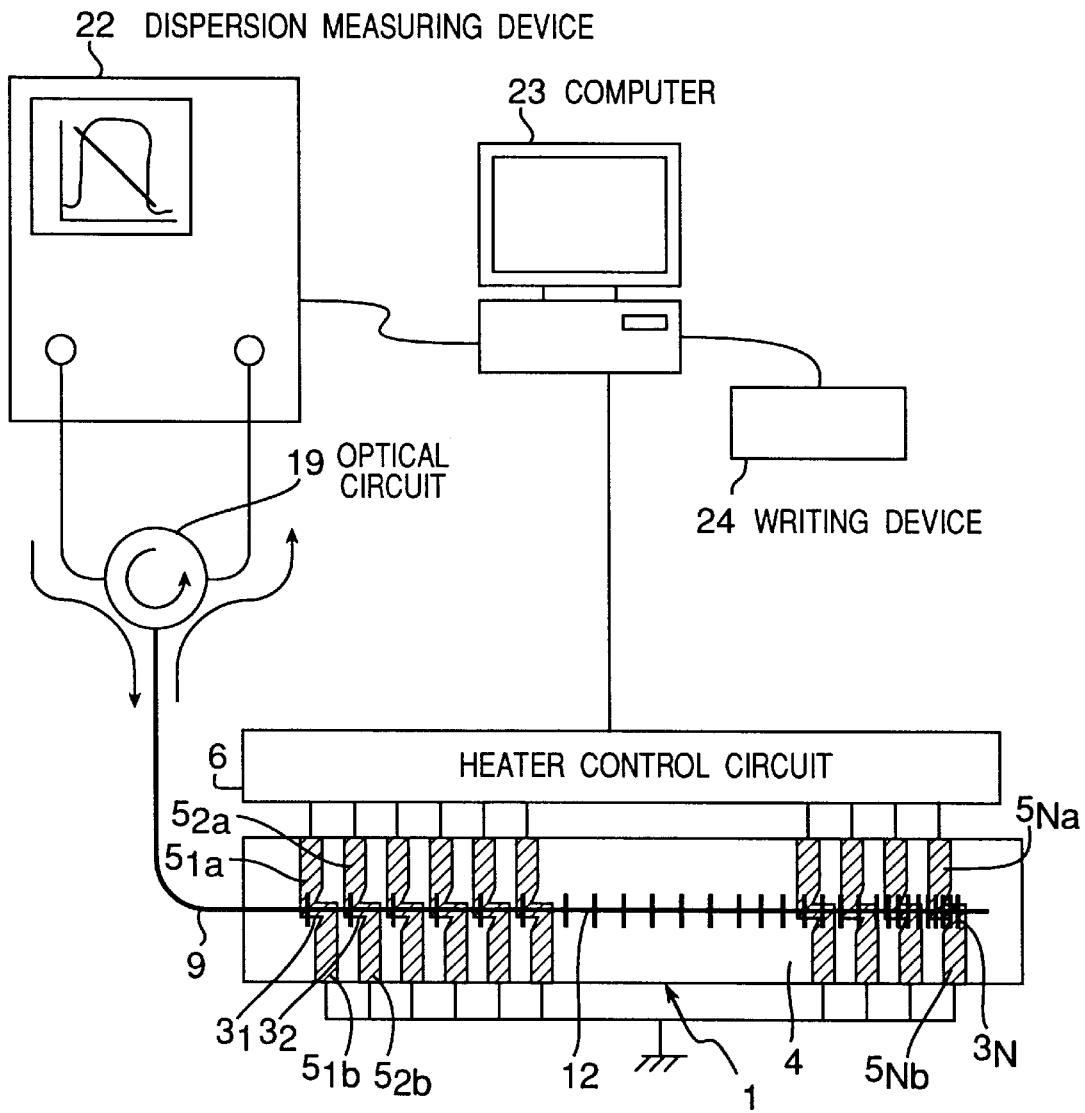

TEMPERATURE CONTROL SYSTEM FOR A GRATING

BACKGROUND OF THE INVENTION

1. Field of the Invention

The present invention relates to a temperature control system for a grating used in dispersion equalizing in an ultra-high-speed optical communication system. Particularly, the temperature control system includes a temperature control device for a grating, a method of storing a temperature control pattern in a storage device, a method of automatically controlling the temperature control device for a grating, and a variable dispersion equalizer.

2. Description of the Prior Art

In an optical communication system using an optical fiber cable as a transmission path, since an optical pulse is distorted by wavelength dispersion (also called dispersion, to be referred to as "dispersion" hereinafter) of the optical fiber, a signal is degraded. A reason why dispersion occurs when the optical fiber cable is used as described above will be described below. In a material constituting a general optical fiber cable, a group velocity of a wave packet of optical pulses depends on a wavelength, and a time required to propagate the wave packet, i.e., a group delay time (unit: ps) changes. An inclination of the group delay time to the wavelength is dispersion (unit: ps/nm). In a single mode fiber used in a general optical fiber transmission path, dispersion generated for a transmission path of 1 km has a value of about 16 ps/(nm·km) at a wavelength of about 1550 nm. This means that the difference between delay times required to propagate optical pulses having wavelengths which are different from each other by 1 nm through a single mode fiber (hereinafter referred to as SMF) of 1 km is 16 ps. For example, a group delay time when optical pulses having wavelengths which are different from each other by 1 nm are propagated through an optical fiber cable of 100 km is 1600 ps which is 100 times the group delay time obtained in the above case.

On the other hand, modulated optical pulses have the spreads of several spectra determined by a modulation method or a bit rate, and an envelope for the optical pulses is of a Gaussian distribution type. For example, in an RZ (return-to-zero) modulation method, when a bit rate (transmission speed) is 10 Gbit/s, intervals between the respective line spectra are 0.08 nm each. However, when the bit rate is 40 Gbit/s, intervals are 0.32 nm each. More specifically, the spread of the line spectrum increases in proportion to a bit rate. In an NRZ (non-return-to-zero) modulation method, the spread of a line spectrum is half the spread of the line spectrum in the RZ modulation method. In this manner, as a bit rate increases, the interval between line spectra which are the components of optical pulses increases. For this reason, the difference between group delay times when the optical pulses are propagated through an optical fiber transmission path increases, distortion of the optical pulses increases. In addition, an influence of a dispersion of an optical fiber transmission path received by optical pulses increases in proportion to the square of a bit rate. For this reason, a device having dispersion which cancels the dispersion of the optical fiber transmission path is inserted into the transmission path, and the dispersions are made close to zero. This technique is a dispersion compensation technique. In particular, a dispersion of a transmission path at a bit rate of 40 Gbit/s or more must be made precisely close to zero. At a bit rate of 80 Gbit/s or more, a dispersion slope which is a rate of a change in dispersion caused by a wavelength must be compensated for.

As a device for equalizing such a dispersion, a variable dispersion equalizer using a chirp grating is known. For example, as shown in a perspective view in FIG. 19, Japanese Laid-Open Patent Publication No. 10-221658 discloses a variable dispersion equalizer using a chirp grating. In a fiber grating 1 serving a chirp grating, circularly cylindrical compact thick-film heaters $3_1, 3_2, \ldots, 3_N$ (N is an integer) consisting of tungsten, NiCr, or the like are arranged in a capillary 2 such as a hollow ceramics consisting of an insulator and having a through hole for fixing a fiber having a relatively large diameter such that the circularly cylindrical compact thick-film heaters $3_1, 3_2, \ldots, 3_N$ are coaxial with the through hole of the capillary 2. Here, the heaters $3_1, 3_2, \ldots, 3_N$ are arranged at equal intervals in the longitudinal direction of the capillary 2. When currents are flowed into the heaters $3_1, 3_2, \ldots, 3_N$ such that the currents increase by a predetermined value, the fiber grating 1 is gradually heated in a micro-section, but is heated with a predetermined temperature gradient as a whole. The equivalent refractive index of the fiber grating 1 changes depending on an applied voltage to realize a linear chirp characteristic. The equivalent refractive index is also called an effective refractive index, is an equivalent refractive index which is received by light propagated through an optical fiber cable, and is a refractive index generated by an interactive function between the refractive indexes of a core and a cladding and a propagation path of light. Although, exactly, the grating pitch of the fiber grating 1 also changes depending on a change in temperature, the change of the grating pitch is neglected because the influence of the change of the grating pitch is smaller than that of the change of the equivalent refractive index.

There was no temperature control device for grating which appropriately controlled a plurality of heaters disposed near the grating to give an appropriate temperature distribution to the grating. More specifically, when powers applied to the heaters disposed near the grating are not appropriately controlled, a temperature distribution given to the grating is incorrect to adversely affect chirp characteristics such as a dispersion and a dispersion slope given to a reflected light component. In this case, a group delay ripple which is a shift from an almost linear relationship between a group delay time and a wavelength is generated. On the other hand, when a temperature distribution given from each heater to the grating is a linear distribution, a group delay ripple caused by a manufacturing error inherent in the grating may occur. In addition, in a conventional variable dispersion equalizer, a group delay ripple which adversely affects transmission quality occurs due to a gradual temperature distribution generated by the plurality of heaters disposed near the grating. In addition, the cycle of the group delay ripple is dependent on the numeral distribution of the heaters. The existence of the group delay ripple having a predetermined cycle or more considerably influences the numeral distribution of the heaters at a high bit rate.

In a variable dispersion equalizer disclosed in Japanese Laid-Open Patent Publication No. 10-221658, a case in which a linear chirp characteristic is given exemplified. However, control of each heater is not concretely described. The heaters are arranged at equal intervals in the longitudinal direction, and the numeral distribution of the heaters is not considered. The cycle of a group delay ripple is not described.

SUMMARY OF THE INVENTION

Therefore, the first object of the present invention to provide a system of variable dispersion equalizer with grating, which gives a predetermined dispersion and a dispersion slope with suppressed a group delay ripple inherent. It is the second object of the present invention to provide a variable dispersion equalizer having the small cycle of a group delay ripple.

In accordance with one aspect of the present invention, there is a temperature control device for controlling a plurality of temperature variable device for grating which are disposed near the grating of a variable dispersion equalizer constituted by an optical waveguide forming the grating and the temperatures of which can be independently controlled. The temperature control device includes a controller for controlling the plurality of temperature variable device. In addition, the controller controls the temperature variable device by a control signal of at least one of the temperature control patterns constituted by combinations of control signals of the temperature variable device.

In another aspect of the present invention the temperature control device further includes a storage device in which a plurality of temperature control patterns constituted by combinations of control signals of the temperature variable device are stored. In addition, the controller controls the temperature variable device by the control signal of at least one of the temperature control patterns selected from the storage device.

In a further aspect of the present invention, the controller includes at least two control signal setting devices and a signal adding device. The at least two control signal setting device set the control signals applied to the plurality of temperature variable device. The signal adding device adds the signals from the respective control signal setting device to transmit added signals to the respective temperature variable device. In addition, the temperature variable device are controlled by the added control signals.

The two control signal setting devices may set a dispersion and a dispersion slope of the grating.

Also, the control signal setting device may further include a control signal setting device for canceling a group delay ripple of the grating.

In a yet further aspect of the present invention, the control signal setting device further includes control signal setting device for applying a constant bias temperature to the entire grating.

The control signal setting device may be constituted by a variable resistor group.

In a yet further aspect of the present invention, the temperature control device further includes a storage device in which a plurality of temperature control patterns constituted by combinations of the control signals of the temperature variable device are stored. In addition, the control signal setting device is set by the control signal of at least one of the temperature control patterns selected from the storage device.

In a yet further aspect of the present invention, a storing method is performed to store the plurality of temperature control patterns constituted by combinations of control signals for controlling the plurality of temperature variable device in the storage device. The storing method includes the following steps of:

STEP 1: applying predetermined initial control signals to the temperature variable device such that a group delay time characteristic of the grating is a predetermined characteristic;

STEP 2: measuring the group delay time characteristic of the grating to compare the measured group delay time characteristic with the predetermined group delay time characteristic;

STEP 3: correcting the initial control signal such that a group delay ripple which is a difference between the measured group delay time characteristic and the predetermined group delay time characteristic is not more then an allowable value to calculate a corrected control signal;

STEP 4: applying the corrected control signal to the respective temperature variable device; and STEP 5: storing a combination of the corrected control signal applied to the respective temperature variable device and the measured group delay time characteristic in storage device.

In addition, the steps are repeated to store the plurality of temperature control patterns in the storage device.

In a yet further aspect of the present invention, a storing method is performed to store the plurality of temperature control patterns constituted by combinations of control signals for controlling the plurality of temperature variable device in the storage device. The storing method includes the following steps of:

STEP 6: causing an operation device to calculate an initial control signal applied to the temperature variable device such that a group delay time characteristic of the grating has a predetermined value;

STEP 7: applying the initial control signal to the respective temperature variable device;

STEP 8: measuring the group delay time characteristic of the grating to compare the measured group delay time characteristic with the predetermined group delay time characteristic;

STEP 9: obtaining the predetermined group delay time characteristic when a group delay ripple which is a difference between the measured group delay time characteristic and the predetermined group delay time characteristic is large, and performing at least once following the sub-steps of:

SUB-STEP 1: causing an operation device to calculate a corrected control signal applied to the temperature variable device;

SUB-STEP 2: applying the corrected control signal to the respective temperature variable device; and SUB-STEP 3: measuring the group delay time characteristic of the grating to compare the measured group delay time characteristic with the predetermined group delay time characteristic; and STEP 10: storing combination of the corrected control signal applied to the respective temperature variable device and the measured group delay time characteristic in storage device when a ripple which is a difference between the measured group delay time characteristic and the predetermined group delay time characteristic is within an allowable range.

In addition, the above steps are repeated to store the plurality of temperature control patterns in the storage device.

In a yet further aspect of the present invention, the controller includes a photoelectric conversion unit and an operation device. The photoelectric conversion unit photoelectrically converts an optical signal reflected by the grating of the optical waveguide. The operation device compares the photoelectrically converted electric signal with a predetermined value to apply the electric signal to the respective temperature variable device such that the electric signal has a value which is not less than the predetermined value.

In a yet further aspect of the present invention, the photoelectrically converted signal is a clock voltage.

In accordance with one aspect of the present invention, there is a method of automatically controlling a temperature control device for controlling a plurality of temperature variable device for grating which are disposed near a grating of a variable dispersion equalizer constituted by an optical waveguide forming the grating and the temperatures of which can be independently controlled. The method includes the following steps of:

STEP 11: converting an optical signal reflected by the grating into an electric signal;
STEP 12: comparing the electric signal with a predetermined value;
STEP 13: adjusting a control signal applied to the respective temperature variable device such that the electric signal has a value which is not less than the predetermined value; and
STEP 14: controlling the respective temperature variable device by the control signal.

In another aspect of the present invention, the temperature variable device is heater, and the electric signal is a clock voltage. In addition, the step of converting includes the following steps of:

STEP 15: acquiring the clock voltage for each predetermined time;
STEP 16: comparing the clock voltage with a predetermined voltage;
STEP 17: changing voltages of a plurality of heaters such that the clock voltage is maximum when the clock voltage has a value which is not more than the predetermined voltage, and performing at least once following the sub-steps of:

SUB-STEP 4: changing the voltages of the respective heaters by a predetermined value; and
SUB-STEP 5: comparing clock voltages with each other before and after the sub-step.

In accordance with one aspect of the present invention, there is a variable dispersion equalizer includes an optical waveguide and a plurality of temperature variable device. The plurality of temperature variable device are disposed near the grating and can be independently controlled with respect to the temperature. In addition, the plurality of temperature variable device are arranged at a numeral distribution defined by a grating pitch $\Lambda(l)$ which is a function of a length l of the grating in the longitudinal direction and an equivalent refractive index $N_{eff}(l)$.

In another aspect of the present invention, the plurality of temperature variable device are arranged such that a numeral distribution of the temperature variable device satisfies a relationship of (the number of temperature variable device per unit length, n) as follows:

$$n \geq 2\Delta/0.1$$

Note that n is the number of temperature variable device (the number of temperature variable device/unit length) in a longitudinal direction of the optical waveguide. It is noted that a difference between products $\Lambda \cdot N_{eff}$ of the grating pitches $\Lambda$ and the equivalent refractive indexes $N_{eff}$ in unit lengths in the longitudinal direction of the optical waveguide is represented by $\Delta$.

In a further aspect of the present invention, the grating is a chirp grating the grating pitch of which is changed in the longitudinal direction of the optical waveguide.

According to a temperature control device of the present invention includes a storage device which stores a plurality of temperature control patterns includes combinations of control signals for controlling a plurality of temperature variable device the temperatures of which can be independently controlled are stored. By the temperature control patterns, the plurality of temperature variable device disposed near a grating of an optical waveguide constituting a variable dispersion equalizer are controlled, so that a predetermined temperature distribution can be given to the grating. A predetermined dispersion and a predetermined dispersion slope can be given to the grating.

According to a temperature control device of the present invention includes at least two control signal setting device for setting control signals applied to a plurality of temperature variable device. In this manner, control signals of at least two types are combined to each other, so that the respective temperature variable device can be controlled.

According to the temperature control device of the present invention, two control signal setting device can set a dispersion and a dispersion slope of the grating, respectively.

In addition, according to the temperature control device of the present invention, a group delay ripple of the grating can be canceled by another control signal setting device.

Furthermore, according to the temperature control device of the present invention, a constant bias temperature can be applied to the entire grating by still another control signal setting device.

According to the temperature control device of the present invention, since the control signal setting device is constituted by a variable resistor group, the control signals can be precisely set with a simple configuration.

Since the temperature control device of the present invention further includes a storage device which stores temperature control patterns, calculation or the like of control signals given to the temperature variable device need not be performed, and setting control signals can be easily performed.

According to a method of storing a temperature control pattern in the storage device of the present invention, a temperature control pattern in which a group delay ripple inherent in a grating is corrected in advance is generated, and can be stored in the storage device. Since various temperature control patterns are stored in the storage device in advance, the temperature control patterns can be easily given to the grating when the grating is used.

According to the method of storing a temperature control pattern in the storage device of the present invention, a temperature control pattern in which a group delay ripple inherent in a grating is corrected in advance is generated, and can be stored in the storage device. Since various temperature control patterns are stored in the storage device in advance, the temperature control patterns can be easily given to the grating when the grating is used.

According to the temperature control device of the present invention, a reflected light component reflected by a grating is converted into an electric signal, and control signals applied to the respective temperature variable device are adjusted such that the electric signal has a predetermined value or more.

According to the temperature control device of the present invention, a reflected light component reflected by a grating is photoelectrically converted into a clock voltage. For this reason, dispersion equalization of the grating can be easily observed by a change in voltage.

According to a method of automatically controlling a temperature control device of the present invention, a reflected light component reflected by a grating is photoelectrically converted into an electric signal, and control signals applied to the respective temperature variable device are adjusted, so that the electric signal has a predetermined value or more. In this manner, dispersion equalization of the grating can be optimized by automatic control.

According to the method of automatically controlling a temperature control device of the present invention, a reflected light component reflected by a grating is photo-electrically converted into a clock voltage, and the respective heaters are adjusted such that the clock voltage is maximum in adjustment of each of the heaters. In this manner, since the clock voltage can be adjusted to have a predetermined value or more, dispersion equalization can be optimized by automatic control.

According to a variable dispersion equalizer, a plurality of temperature variable device are arranged at a numeral distribution defined by a grating pitch $\Lambda(l)$ which is a function of a length l of the grating in the longitudinal direction and an equivalent refractive index $N_{eff}(l)$. In this manner, an influence of a step-formed temperature distribution generated by heaters is suppressed, a group delay ripple generated in a reflected light component by the grating can be reduced, and the cycle of the group delay ripple can be reduced.

According to the variable dispersion equalizer of the present invention, the plurality of temperature variable device are arranged such that a numeral distribution of the temperature variable device satisfies a relationship of (the number of temperature variable device per unit length, n) as follows:

$$n \geq 2\Lambda/0.1$$

In this manner, an influence of a step-formed temperature distribution generated by heaters is suppressed, a group delay ripple generated in a reflected light component by the grating can be reduced, and the cycle of the group delay ripple can be reduced.

In addition, according to the variable distribution equalizer of the present invention, since a chirp grating is used, a predetermined distribution can be given to the grating without giving a linearly functional temperature distribution by the plurality of temperature variable device.

BRIEF DESCRIPTION OF THE DRAWINGS

FIG. 9 is a block diagram showing the configuration of a system used in the method of storing the temperature control pattern of the second embodiment of the present invention;

DETAILED DESCRIPTION OF THE INVENTION

Figure 1A:
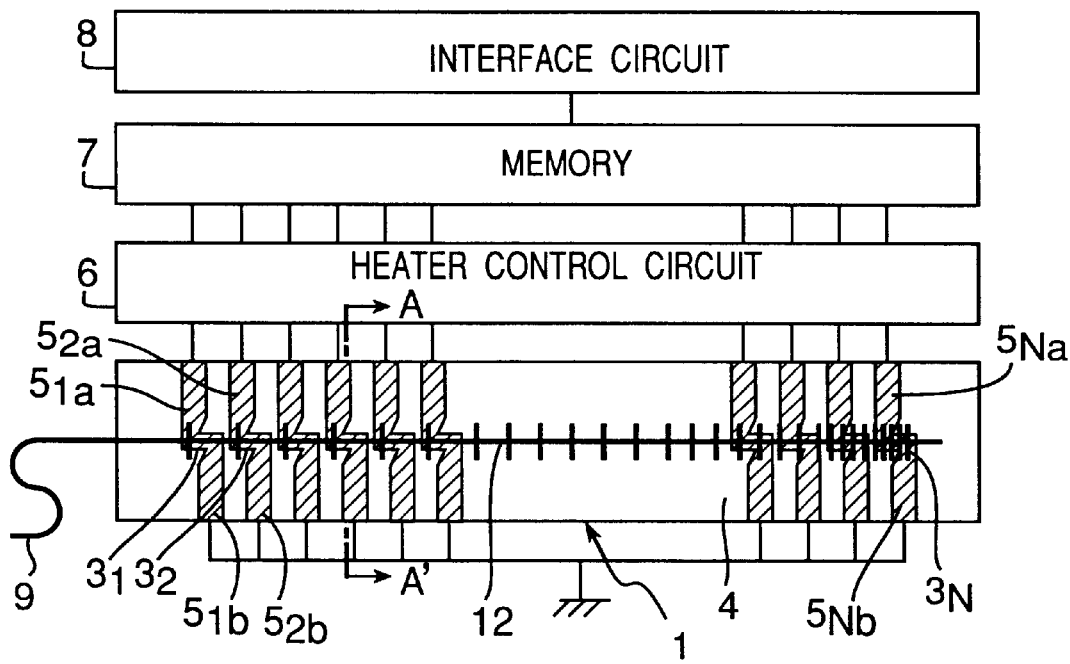
FIG. 1A is a block diagram showing the relationship between a temperature control device and a variable dispersion equalizer of the first embodiment of the present invention.

A temperature control device according to an embodiment of the present invention will be described below by using the accompanying drawings to make it easy to understand the invention. The same reference numerals as in the accompanying drawings denote the same parts in the accompanying drawings. The first aspect of a temperature control device for grating according to an embodiment of the present invention has a storage device in which a plurality of temperature control patterns which are combinations of control signals for controlling a plurality of temperature variable device disposed near the grating of an optical waveguide constituting a variable dispersion equalizer are stored. In this manner, various dispersions and various dispersion slopes can be easily given to the grating.

In a method of storing a temperature control pattern in the storage device according to the embodiment of the present invention, a dispersion for an actual grating is measured to be compared with a dispersion to be set. The temperature of a temperature variable device at a position corresponding to a wavelength at which a group delay ripple is generated is controlled to make the group delay ripple lower than an allowable value, and control signals to respective temperature variable device are stored in the storage device. In this manner, a plurality of temperature control patterns which can give various dispersions and various dispersion slopes to the grating can be stored in the storage device, and the temperature control patterns can be easily set in the respective temperature variable device. In addition, a group delay ripple inherent in the grating can be corrected in advance.

The second aspect of a temperature control device according to the embodiment of the present invention has at least two control signal setting device for setting control signals applied to a plurality of temperature variable device disposed near a grating of an optical waveguide constituting a variable dispersion equalizer, and a signal adding device for adding the at least two control signals. In this manner, control signals of at least two types are added to each other, so that the control signals can be simultaneously given. For example, dispersions for a grating can be controlled, and control signals which cancel a group delay ripple can be given.

The third aspect of a temperature control device according to the embodiment of the present invention includes a controller for controlling a plurality of temperature variable device, a photoelectric conversion unit for photoelectrically converting a reflected light component from a grating, and an operation device for adjusting respective temperature variable device such that an electric signal obtained after photoelectric conversion is equal to or larger than with a predetermined value. In this manner, dispersion equalization of the grating can be optimized by automatic control.

In a variable dispersion equalizer according to the embodiment of the present invention, a plurality of temperature variable device disposed near a grating of an optical waveguide constituting the variable dispersion equalizer are arranged with a dispersion of the number of temperature variable device defined by a grating pitch $\Lambda$ and an equivalent refractive index $N_{eff}$. In this manner, a cycle of a group delay ripple can be decreased to a value which does not adversely affect an optical signal.

A temperature control device for grating of the first embodiment of the present invention has a storage device in which a plurality of temperature control patterns which are combinations of control signals for controlling a plurality of temperature variable device disposed near the grating of an optical waveguide constituting a variable dispersion equalizer are stored. The temperature variable device are controlled by the control signal of a temperature control pattern selected from the storage device in a control unit, so that a predetermined temperature distribution can be given to the grating. In this manner, various dispersions and various dispersion slopes can be easily given to the grating.

Figure 1B:
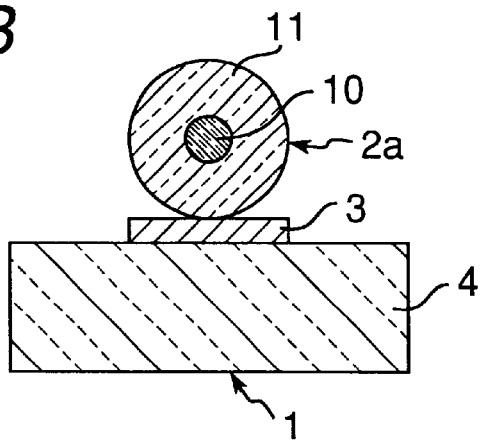
FIG. 1B is a sectional view showing the temperature control device the variable dispersion equalizer along an A–A' line in FIG. 1A.

More specifically, the temperature control device, as shown in the block diagram in FIG. 1, includes a heater control circuit 6 serving as a control unit for applying control signals to heaters 3 disposed near a grating of an optical waveguide constituting a variable dispersion equalizer 1 through an electrode unit 5, and a memory 7 in which a plurality of temperature control patterns which are combinations of control signals applied to the heaters 3 are stored. In addition, the temperature control device includes an interface circuit 8 for transmitting a specific temperature control pattern selected from the memory 7. More specifically, in this temperature control device, when dispersions and dispersion slopes to be set are input to the interface circuit 8, a predetermined temperature control pattern is selected from the plurality of temperature control patterns stored in the memory 7 such as a ROM on the basis of a signal from the interface circuit 8. This temperature control pattern is constituted by a combination of control signals for the heaters 3 serving as temperature variable device for a temperature distribution given to the grating such that the dispersions and the dispersion slopes are set to be predetermined values. On the basis of the control signals, the heater control circuit 6 applies powers to compact thick-film heaters $3_1, 3_2, \ldots, 3_N$ to give a predetermined temperature distribution to the grating.

Figure 2:
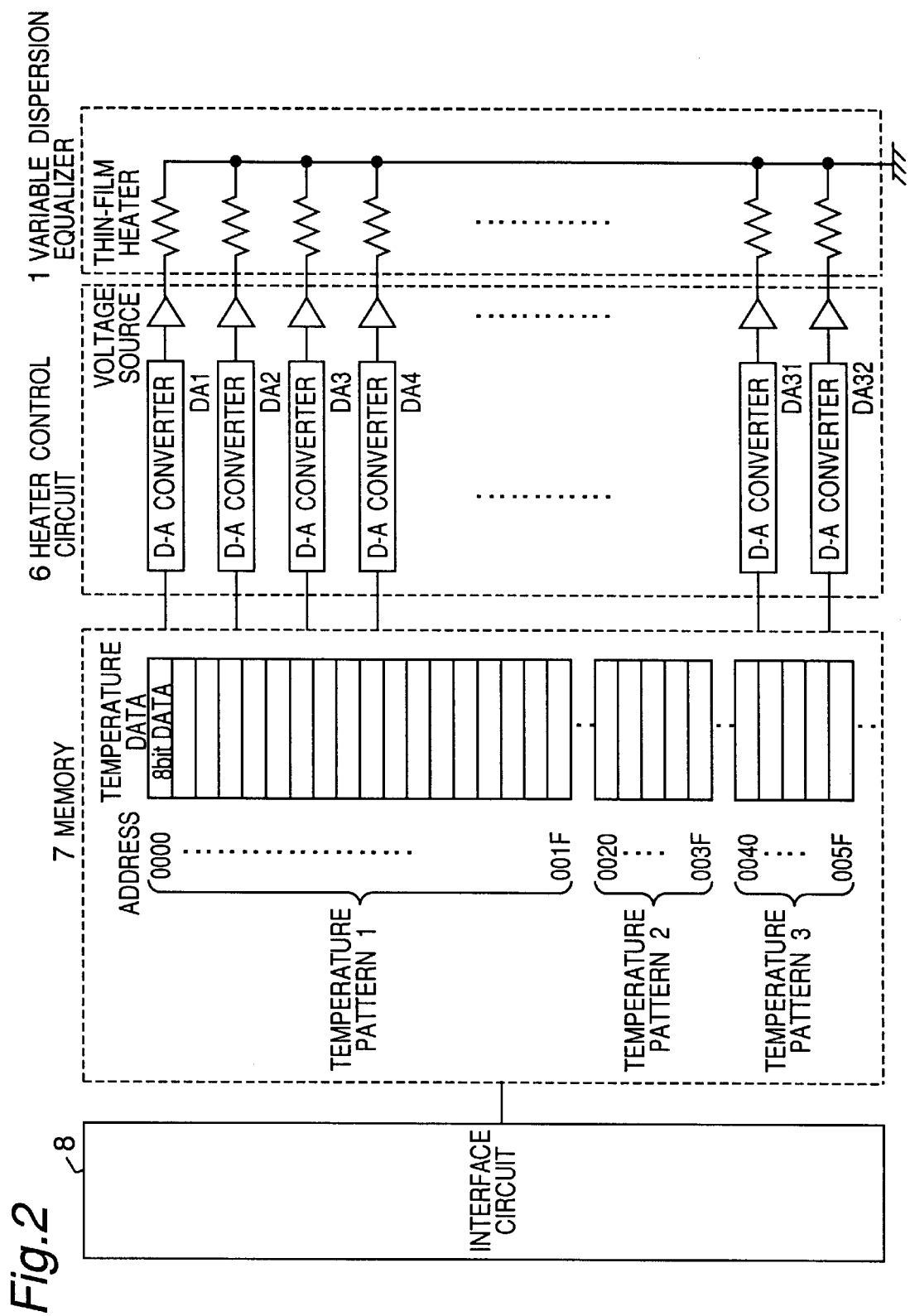
FIG. 2 is a block diagram of a control system of a temperature control device of the first embodiment of the present invention.

The operation of the temperature control device for grating will be described below. A block diagram related to a control system for the heater control circuit 6 and the memory 7 constituting the temperature control device is shown in FIG. 2. The number of thin-film heaters 3 is set to be thirty-two and expressed as resistors. For example, when a user sets dispersion and dispersion slopes from the interface circuit 8, the interface circuit 8 transmits an address of the memory 7 in which temperature patterns (temperature control patterns) for realizing the dispersions and the dispersion slopes are stored. A plurality of temperature control patterns are recorded in the memory 7 to select one of the temperature control patterns. FIG. 2, when a "temperature pattern 1" is selected, the interface circuit 8 designates an output of a start address "0000" of the memory 7 in which the variable dispersion equalizer 1 is recorded. In this case, thirty-two data at addresses "0000" to "001F" in the memory 7 are transmitted to the heater control circuit 6. The temperature data of the thin-film heaters $3_1, 3_2, 3_3, \ldots, 3_{32}$ are recorded at the addresses "0000", "0001", "0002", . . . , "001F" of the memory 7. The respective temperatures are converted into analog voltages or currents by D-A converters DA1, DA2, . . . , DA32, the analog voltages or the currents are applied to the thin-film heaters $3_1, 3_2, \ldots, 3_{32}$ as control signals, and a predetermined temperature distribution is given to the grating. On the other hand, when the capillary 2 is set, data at addresses "0020" to "003F" are similarly transmitted to the heater control circuit 6 to set the thin-film heaters 3 at a predetermined temperature. In this manner, with respect to the plurality of heaters 3, when data for controlling the thin-film heaters 3 to have a predetermined temperature pattern are stored in the memory 7, the temperature control pattern can be easily changed without a cumbersome setting in use of the temperature control device for grating. Dispersions and dispersion slopes for the gratings can be easily changed.

In this case, the interface circuit 8 is a circuit for converting a dispersion and a dispersion slope designated by a user into addresses to the memory 7. For example, it is assumed that an address corresponding to the dispersion is allocated to an upper bit "FFXX" of the address, and that an address corresponding to the dispersion slope is allocated to a lower bit "XXFF". In this case, as the interface circuit 8, an interface circuit 8 in which two A-D converters for converting analog voltages into 8-bit digital signals are arranged can be used. More specifically, when the magnitudes of voltage values linearly corresponding to the values of the dispersion and the dispersion slope are adjusted, these voltage values are output from the interface circuit 8 to the memory 7 as addresses of the memory 7. With this configuration, the temperature patterns of 256 dispersions and 256 dispersions can be independently selected. The allocation of the dispersions and the dispersion slopes is not limited to this ratio. For example, an arbitrary allocation can be obtained such that 4096 dispersions and 16 dispersion slopes are set.

In addition, the configuration of the variable dispersion equalizer 1 for controlling a temperature by the temperature control device for grating will be described below. An optical waveguide constituting the variable dispersion equalizer 1, as shown in the sectional view in FIG. 1B, an optical fiber 2a constituted by a core 10 and a cladding 11 covering the core 10. A chirp grating 12 the grating pitch of which linearly changes is formed and arranged on a substrate 4 having a low heat conductivity. As the substrate 4 having a low heat conductivity, for example, a substrate consisting of ceramics such as silica or glass or a resin such as polyimide can be used. In addition, the compact thick-film heaters $3_1, 3_2, \ldots, 3_N$ are arranged between the optical fiber 2a and the substrate 4. Electrode units $5_{1a}, 5_{2a}, \ldots, 5_{Na}, 5_{1b}, 5_{2b}, \ldots, 5_{Nb}$ are formed by a thin-film process simultaneously with the compact thick-film heaters $3_1, 3_2, \ldots, 3_N$. Although the electrode units $5_{1a}, 5_{2a}, \ldots, 5_{Na}, 5_{1b}, 5_{2b}, \ldots, 5_{Nb}$ consist of the same material as that of the thin-film heater, the line widths are sufficiently wide to make resistances small. For this reason, in each electrode unit 5, an increase in temperature is negligibly smaller than that of the thin-film heater 3. In addition, when a metal thin film consisting of copper or silver having a high electric conductivity is formed on the electrode units 5, the efficiency of the electrode units 5 can be further improved. The electrode units $5_{1a}, 5_{2a}, \ldots, 5_{Na}$ are connected to the heater control circuit 6, and the electrode units $5_{1b}, 5_{2b}, \ldots, 5_{Nb}$ are connected to the ground (GND) by lead lines. An optical fiber 9 serving as an optical signal input/output unit is arranged at one end of the chirp grating 12. A protective member (not shown) for protecting the chirp grating 12 and reinforcing contact to the thin-film heaters 3 may be arranged on the chirp grating 12. The configuration and the operation of the interface circuit 8, the memory 7, the heater control circuit 6, and the like are not limited to the above. For example, the memory 7 may include a ROM, a clock oscillator, a buffer circuit, and the like. In addition, in the heater control circuit 6, a pulse voltage or current can be digitally applied in a time sharing manner without causing a D-A converter to convert a control signal into an analog voltage or current. Even though an optical fiber is not used as the optical waveguide, but a planar Lightwave Circuit (to be referred to as a PLC hereinafter) is used as the optical waveguide, the same configuration as described above can be employed.

The operation of dispersion equalization of the variable dispersion equalizer the temperature of which is controlled by the temperature control device for a grating will be described by using the conceptual diagram in FIG. 3. A light component having a wavelength $\lambda_B$ is reflected when a grating pitch $\Lambda$ and an equivalent refractive index $N_{eff}$ of the chirp grating 12 satisfy the following equation 1:

$$\lambda_B = 2 N_{eff} \Lambda \qquad \text{[Equation 1]}$$

Figure 3:
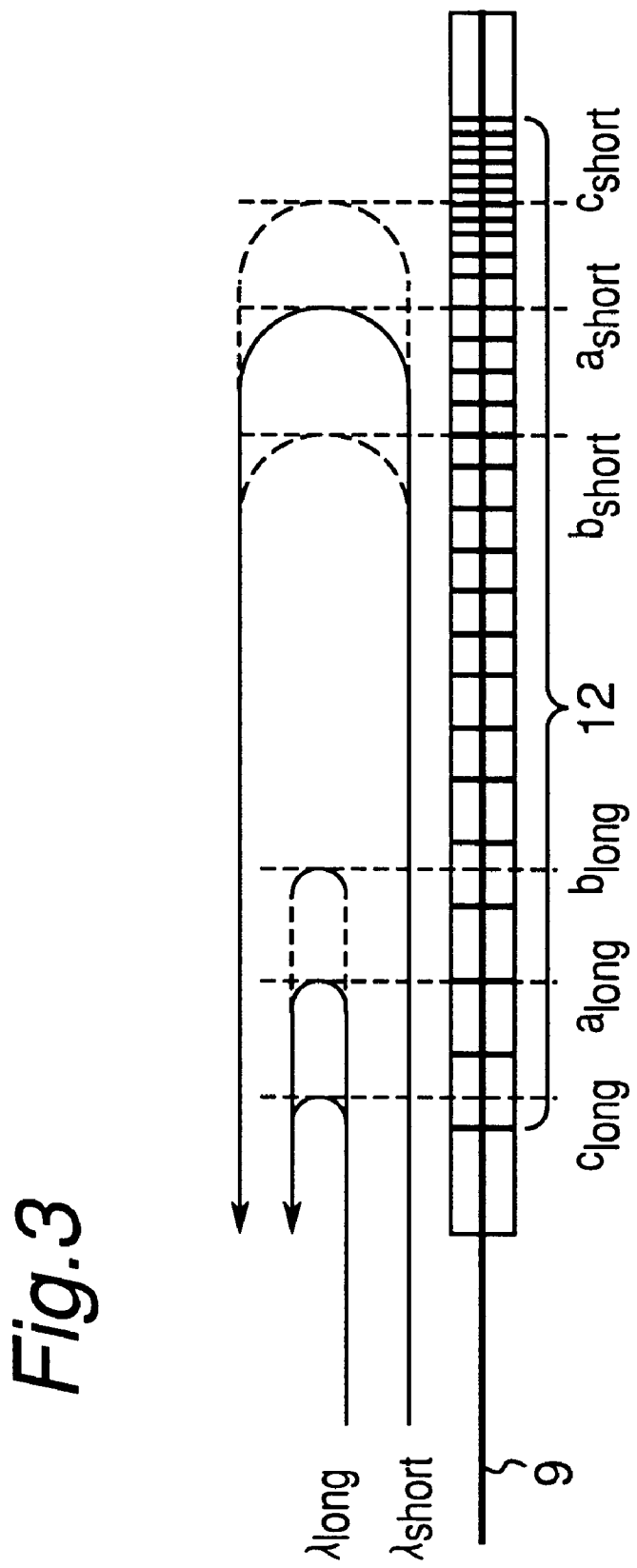
FIG. 3 is a conceptual diagram showing the relationship between a reflection wavelength and a reflected position when the dispersion of a grating is changed.

For example, as shown in FIG. 3, a manner of reflection of a light component input into a chirp grating the grating pitch of which is gradually increased from the input/output side to the right side will be considered. In this case, a light component $\lambda_{long}$ having a long wavelength is reflected at a position $a_{long}$ near the input/output side, and a light component $\lambda_{short}$ having a short wavelength is reflected at a position $a_{short}$ distant from the input/output side. For this reason, since the light component $\lambda_{short}$ having a short wavelength is propagated for a distance longer than that of the light component $\lambda_{long}$ having a long wavelength, a group delay time becomes long. In this manner, a group delay time depends on a wavelength in the chirp grating, and a predetermined dispersion can be obtained. A dispersion having a sign reverse to the sign of an optical fiber transmission path is given to the transmission path, so that dispersion equalization can be performed.

However, the dispersion of the optical fiber transmission path depends on a surrounding environment such as a distance and a temperature and is not constant. For this reason, the dispersion of a dispersion equalizing device should be depended on the dispersion of the optical fiber. For this purpose, a temperature distribution is given to the grating to change the equivalent refractive index $N_{eff}$, positions at which the light components having respective wavelengths are reflected are changed to make the dispersion variable. An example in which the dispersion of the variable dispersion equalizer 1 is controlled is expressed in the relationship between temperature distributions obtained at grating positions in FIGS. 4A, 5A, 6A, and 7A and wavelengths and group delay times in FIGS. 4B, 5B, 6B, and 7D. In this manner, a dispersion changes by a temperature distribution given to the grating by the heaters disposed near the grating.

Figure 4A:
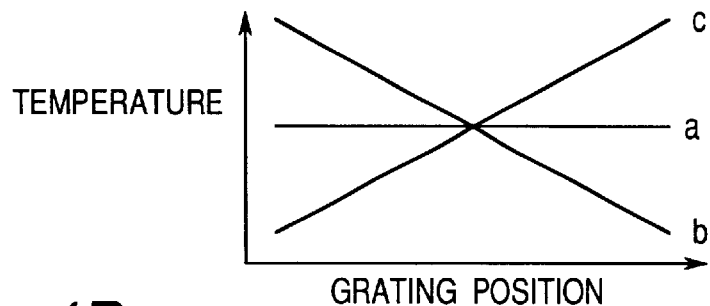
FIG. 4A is a graph showing a linearly functional temperature distribution in a chirp grating in a temperature control device of the first embodiment of the present invention.
Figure 4B:
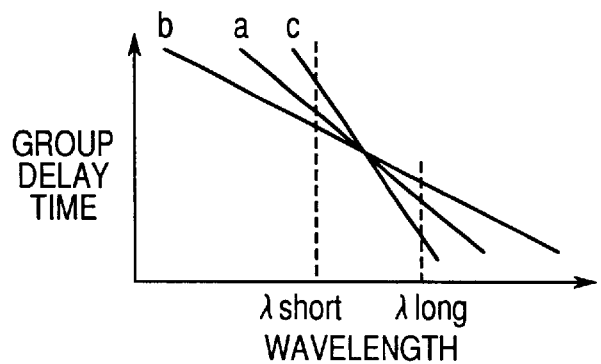
FIG. 4B is a graph showing the relationship a group delay time characteristic to a wavelength generated in FIG. 4A.

More specifically, in the graph of the temperature distributions at the grating positions in FIG. 4A, a straight line a indicates a case in which the temperatures of the compact thick-film heaters $3_1, 3_2, \ldots, 3_N$ are constant, and the equivalent refractive index $N_{eff}$ of the chirp grating is constant with respect to the longitudinal direction of the grating. This case is similar to the case in which temperature control is not performed as described above. The wavelength of a light component reflected by the chirp grating is in proportion to a grating pitch $\Lambda$. Therefore, since the light component $\lambda_{short}$ having a short wavelength is propagated for a distance longer than that of the light component $\lambda_{long}$ having a long wavelength, a group delay time becomes long. The relationship of the group delay time to the wavelength at this time is indicated by a straight line as shown in FIG. 4B. In addition, when the temperature distribution of the heaters 3 has a high temperature on a side near the input/output side and a low temperature on a side distant from the input/output side, an equivalent refractive index on the side near the input/output side becomes large, and an equivalent refractive index on the side distant from the input/output side becomes small. Therefore, the light component $\lambda_{long}$ having a long wavelength, as shown in FIG. 3, is reflected at a position $b_{long}$, and the light component $\lambda_{short}$ having a short wavelength is reflected at a position $b_{short}$, so that the relationship of the group delay time to the wavelength is given by a straight line b in FIG. 4B. When the temperature distribution of the heaters 3 is indicated by a straight line c in FIG. 4A, the relationship of the group delay time to the wavelength has an inclination which increases as indicated by a straight line c in FIG. 4B. Since the dispersion is the inclination of the group delay time, i.e., the wavelength differentiation of the group delay time, dispersion variation can be realized by changing the temperature distribution of the heaters as described above.

Figure 5A:
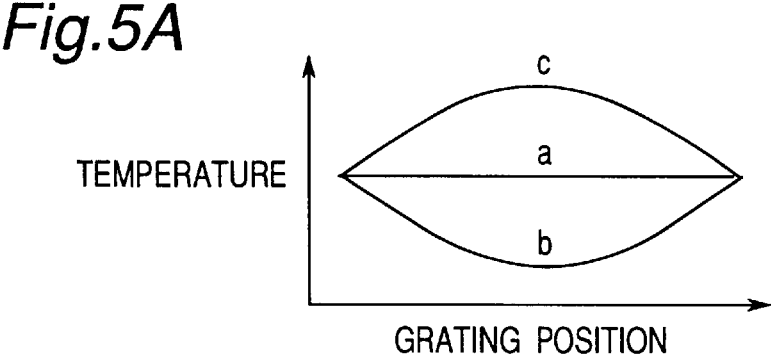
FIG. 5A is a graph showing quadratically functional temperature distribution in a chirp grating in a temperature control device of the first embodiment of the present invention.
Figure 5B:
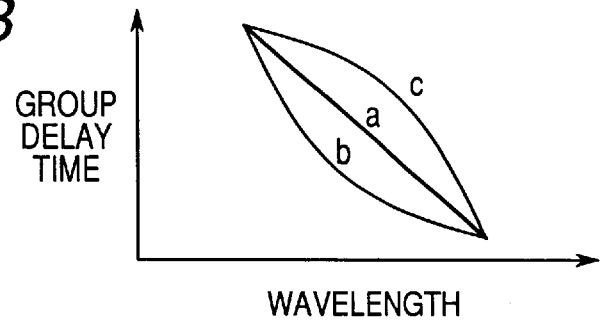
FIG. 5B is a graph showing the relationship of a group delay time characteristic to a wavelength generated in FIG. 5A.
Figure 6A:
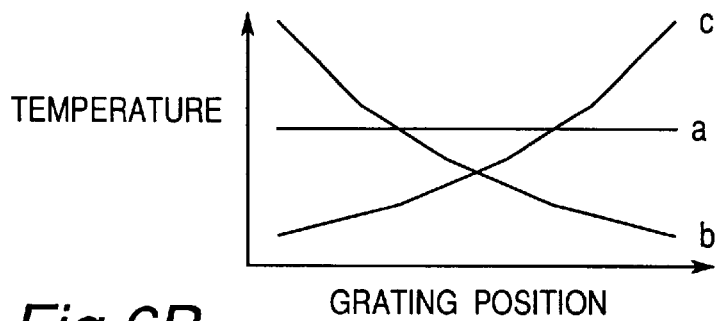
FIG. 6A is a graph showing a quadratically functional temperature distribution having a downwardly convex shape in a chirp grating obtained by the temperature control device of the first embodiment of the present invention.
Figure 6B:
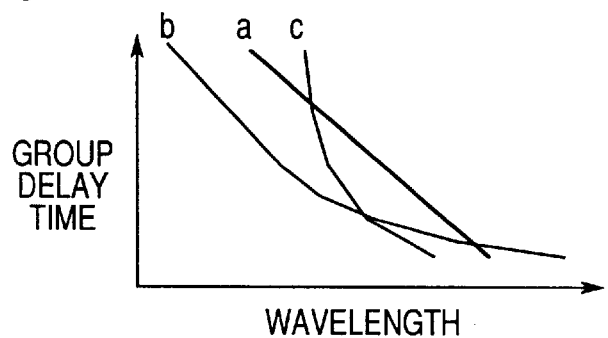
FIG. 6B is a graph showing the relationship of a group delay time characteristic to a wavelength generated in FIG. 6A.
Figure 7A:
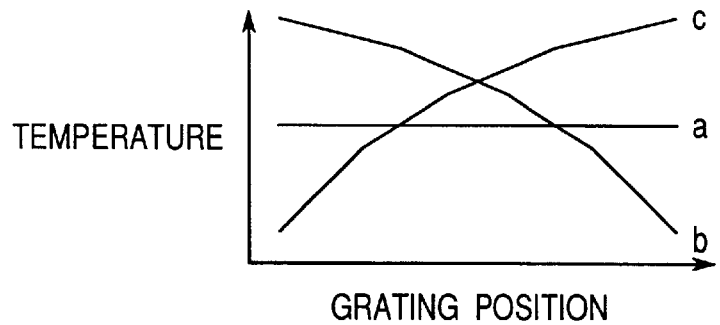
FIG. 7A is a graph showing a quadratically functional temperature distribution having a upwardly convex shape in a chirp grating obtained by the temperature control device of the first embodiment of the present invention.
Figure 7B:
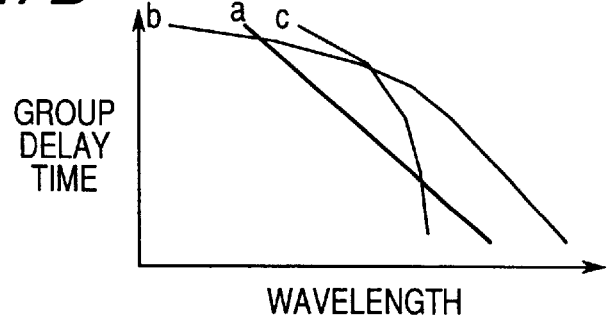
FIG. 7B is a graph showing the relationship of a group delay time characteristic to a wavelength generated in FIG. 7A.

Giving a quadratically functional temperature distribution to the grating by the same principle as shown in FIG. 5A, a group delay time characteristic as shown in FIG. 5B is given. Since curves b and c in FIG. 5B have inclinations which are almost equal to that of the straight line near a central wavelength, the dispersions at the central wavelength are equal to each other. However, a dispersion slope which is a two-step differentiation for the wavelength of the group delay time changes. More specifically, when the temperature distribution of the heaters is changed as indicated by (b1) in FIGS. 5A and 5B, the dispersion slope can be made variable. In addition, a temperature distribution obtained by adding a temperature distribution of a linear function and a temperature distribution of a quadratical function to each other as shown in FIG. 6A or FIG. 7A is set, a group delay time characteristic shown in FIG. 6B or FIG. 7B is obtained, and both the dispersion and the dispersion slope can be made variable.

In a method of storing a temperature control pattern in the storage device of the second embodiment of the present invention, control signals corresponding to dispersions to be set in a variable equalizer are applied to temperature variable device, and a dispersion of the variable dispersion equalizer is measured. This dispersion is compared with the dispersions to be set. The temperatures of a temperature variable device at a position corresponding to a wavelength at which a group delay ripple is generated is controlled to make the group delay ripple lower than an allowable value, and control signals to the respective variable device are stored in a storage device. More specifically, a plurality of temperature control patterns which can various dispersions and various dispersion slopes are stored in the storage device in advance. The temperature control patterns can be easily set for the respective temperature variable device. A group delay ripple inherent in a grating can be corrected in advance.

Figure 8:
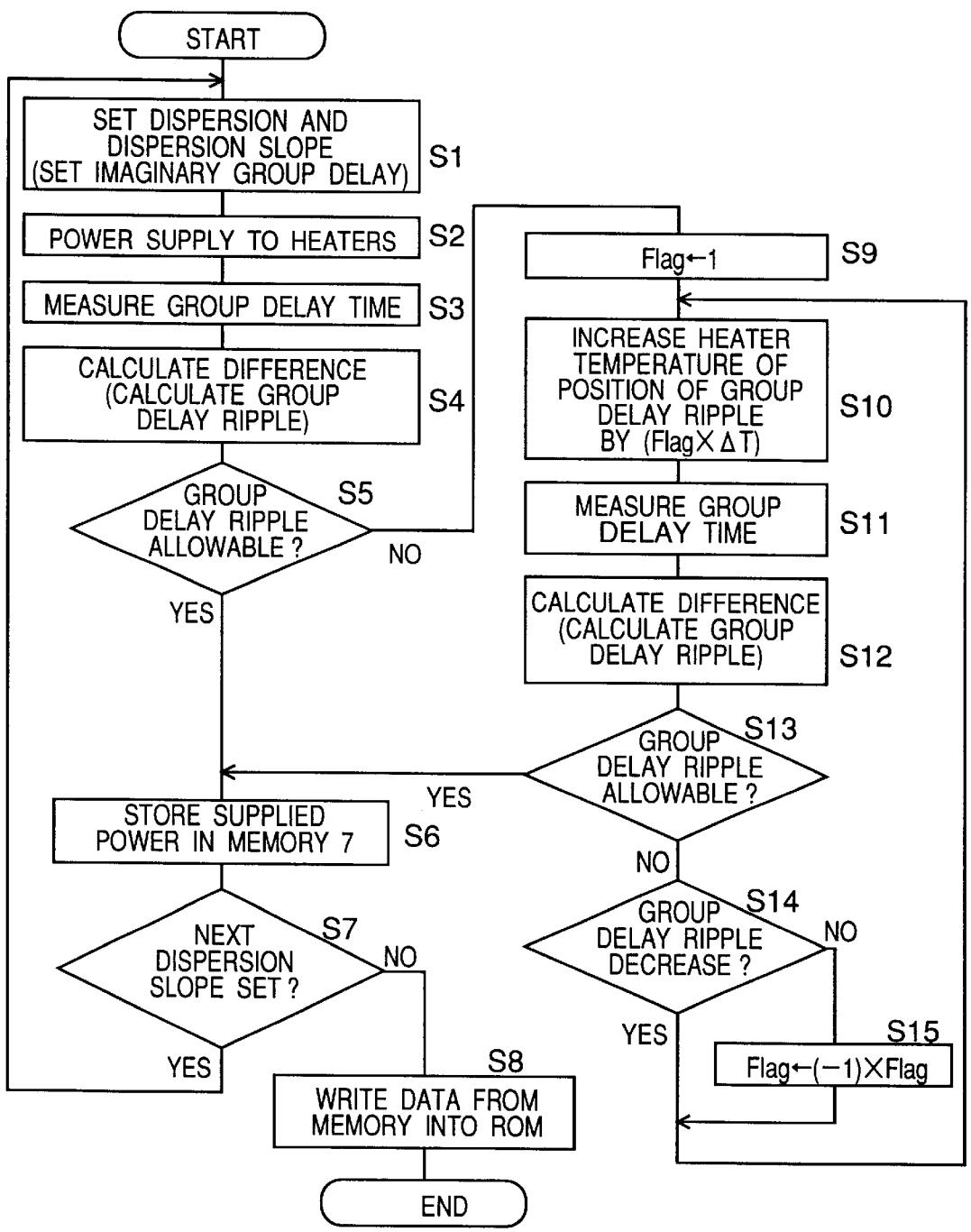
FIG. 8 is a flow chart of a method of storing a temperature control pattern of the second embodiment of the present invention.

More specifically, the method of storing temperature control patterns in the storage device is performed by the procedures shown in the flow chart in FIG. 8. A predetermined dispersion and a predetermined dispersion slope are set (S1). Powers corresponding the dispersion and the dispersion slope to be set are supplied to heaters (S2). A dispersion of an actual grating is measured by a dispersion measurer to obtain a group delay time characteristic (S3). The difference between the set group delay time characteristic and an actual group delay time characteristic, i.e., a group delay ripple is calculated (S4). It is decided whether the group delay ripple is equal to or smaller than an allowable value or not (S5). If the group delay ripple is equal to or smaller than the allowable value, power supplies to the heaters are stored in a memory (S6). Thereafter, it is decided whether the next dispersion and the next dispersion slope are set or not (S7). If the next setting is not performed, data from the memory is written in a ROM device (S8), and, thereafter, the procedure is ended. On the other hand, when the group delay ripple exceeds the allowable value in S5, 1 is set in Flag (S9), and the temperature of a heater at a position corresponding to a wavelength at which the group delay ripple is generated is increased by a product (Flag×ΔT) of a predetermined width ΔT and Flag (S10). As in the procedures in S3 to S5, the dispersion of the actual grating is measured by a dispersion measure to obtain a group delay time characteristic (S 11). The difference between the set group delay time characteristic and an actual group delay time characteristic, i.e., a group delay ripple is calculated (S12). It is decided whether the group delay ripple is equal to or smaller than an allowable value or not (S13). If the group delay ripple is equal to or smaller than the allowable value, the flow shifts to the procedures following S6. On the other hand, if the group delay ripple exceeds the allowable value, it is decided whether the group delay ripple is smaller than that measured in S4 or not (S14). If the group delay ripple is larger than the group delay ripple in the previous measure, Flag is inverted (S15). In addition, a procedure in which a heater temperature at a corresponding position is decreased by (Flag×ΔT) such that the group delay ripple is equal to or smaller than the allowable value is repeated. In this manner, data of power supplies to the respective heaters in which the dispersions and the dispersion slopes to be set can be obtained, temperature control patterns can be stored in the ROM device.

A system used in the method of storing temperature control patterns in the storage device, as shown in the block diagram in FIG. 9, the thin-film heaters 3 are disposed near the chirp grating of an optical waveguide constituting the variable dispersion equalizer 1. Powers from the heater control circuit 6 are supplied to the thin-film heaters through the electrodes 5. The heater control circuit 6 is connected to a computer 23. The powers of the respective heaters 3 are independently controlled by control signals from the computer 23. On the other hand, the optical fiber 9 serving as an optical signal input/output unit of the variable dispersion equalizer 1 is connected to a dispersion measuring device 22 through an optical circulator 19. As the dispersion measuring device 22, for example, a measuring device or the like by a phase shift method using a modulated wavelength variable laser can be used. The dispersion measuring device 22 is connected to the computer 23 by GPIB or the like, and can take the group delay time characteristic and the amplitude characteristic of the variable dispersion equalizer measured by the dispersion measuring device 22 into the computer 23. Although the characteristic of the variable dispersion equalizer is measured by a dispersion measurer, another measuring device such as a spectrum analyzer may be used. In this case, in order to measure the dispersion characteristic, although the group delay characteristic and the amplitude characteristic are not direct characteristics of the dispersion and the dispersion slope, the group delay characteristic and the amplitude characteristic are related to each other and can be converted.

In this system, a method for storing temperature control patterns in the storage device such as a ROM will be described below. A control signal is transmitted from the computer 23 to the heater control circuit 6 such that the variable dispersion equalizer has a predetermined dispersion and a predetermined dispersion slope (S1). The temperature distributions of the respective heaters 3 are controlled by the heater control circuit 6 (S2), and a dispersion and a dispersion slope corresponding to the temperature distribution of the grating 12 are obtained. A group delay time characteristic at this time is measured by the dispersion measuring device 22 (S3). The resultant data is taken into the computer 23. The group delay characteristic and an imaginary group delay characteristic in which a desired dispersion and a desired dispersion slope are compared with each other (S4, S5). If the dispersion and the dispersion slope are different from the desired dispersion and the desired dispersion slope, respectively, a control signal which changes the temperatures of the heaters by predetermined values to obtain the desired dispersion and the desired dispersion slope is transmitted to the heater control circuit 6 (S9, S10). In addition, the group delay time characteristic is measured by the dispersion measuring device 22 (S11). The resultant data is taken into the computer 23. The group delay characteristic and an imaginary group delay characteristic in which a desired dispersion and a desired dispersion slope are compared with each other (S12, S13). The series of operations are repeated to obtain data of power supplies to the heaters which can realize temperature distributions serving as a desired dispersion and a desired dispersion slope can be obtained. In addition, temperature dispersions serving as another dispersion and another dispersion slope are determined by repeating the same procedures as described above. In this manner, data serving as the plurality of temperature control patterns are measured as described above, the data are transferred to a ROM writing device to be stored in the ROM (S8). The plurality of data can be stored in the memory 7 by the above procedures. In this case, although a group delay ripple caused by a chirp grating to be used, the group delay ripple can be corrected without any conscience, and a desired dispersion and a desired dispersion slope can be realized.

A temperature control device for a grating of the third embodiment of the present invention has at least two control signal setting device for setting control signals applied to a plurality of temperature variable device disposed near a grating of an optical waveguide constituting a variable dispersion equalizer, and a signal adding device for adding the at least two control signals. In this manner, the control signals of at least two types are added to each other, and can be simultaneously given. For example, a dispersion of the grating is set to be a predetermined value, and control signals which cancel a group delay ripple can be given.

Figure 10A:
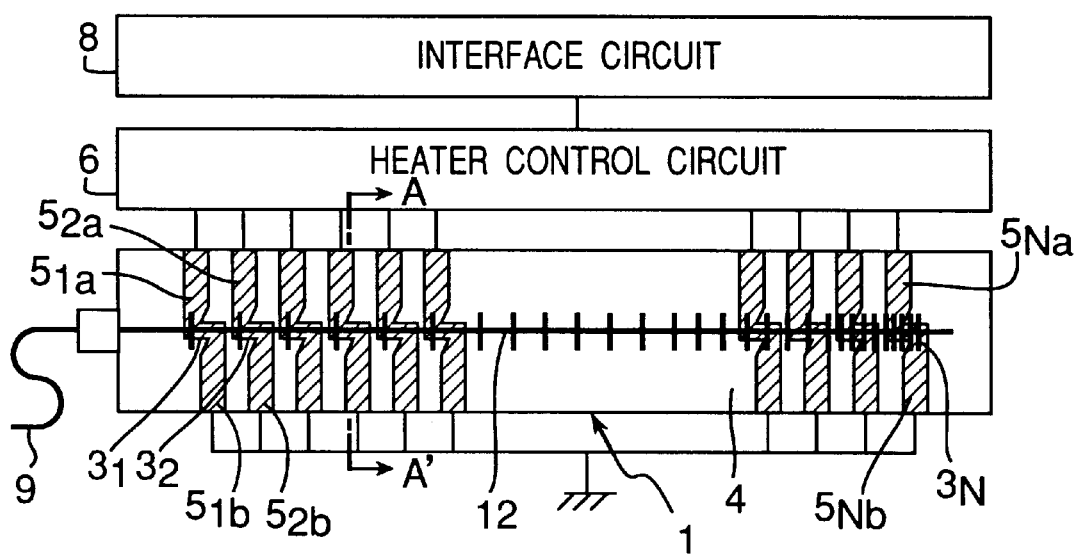
FIG. 10A is a block diagram showing the relationship between a temperature control device and a variable dispersion equalizer of the third embodiment of the present invention.
Figure 10B:
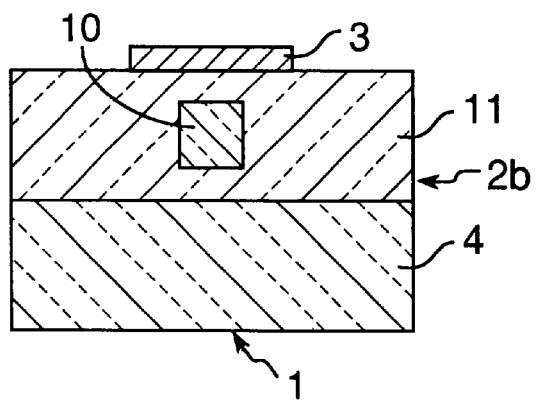
FIG. 10B is a sectional view showing the temperature control device the variable dispersion equalizer along an A–A' line in FIG. 10A.

More specifically, as compared with the temperature control device of the first embodiment, as shown in the block diagram in FIG. 10A, the both differ from each other in that control signals are directly transmitted from an interface circuit 8 to a heater control circuit 6 for independently supplying powers to heaters 3 without passing through a memory. In addition, the temperature control devices for grating are also different from each other in that the optical waveguide constituting the variable dispersion equalizer 1 for performing temperature control by the temperature control device for grating, as shown in the sectional view in FIG. 10B, is a planar lightwave circuit (to be referred to as a PLC hereinafter) 2b. In the variable dispersion equalizer 1, a cladding and a core are formed on a substrate 4 consisting of Si or $SiO_2$ to form an optical waveguide 2, and thin-film heaters 3 on the cladding corresponding to the upper portion of the core of the PLC 2b. Even though an optical fiber is used, the same configuration can be obtained.

Figure 11:
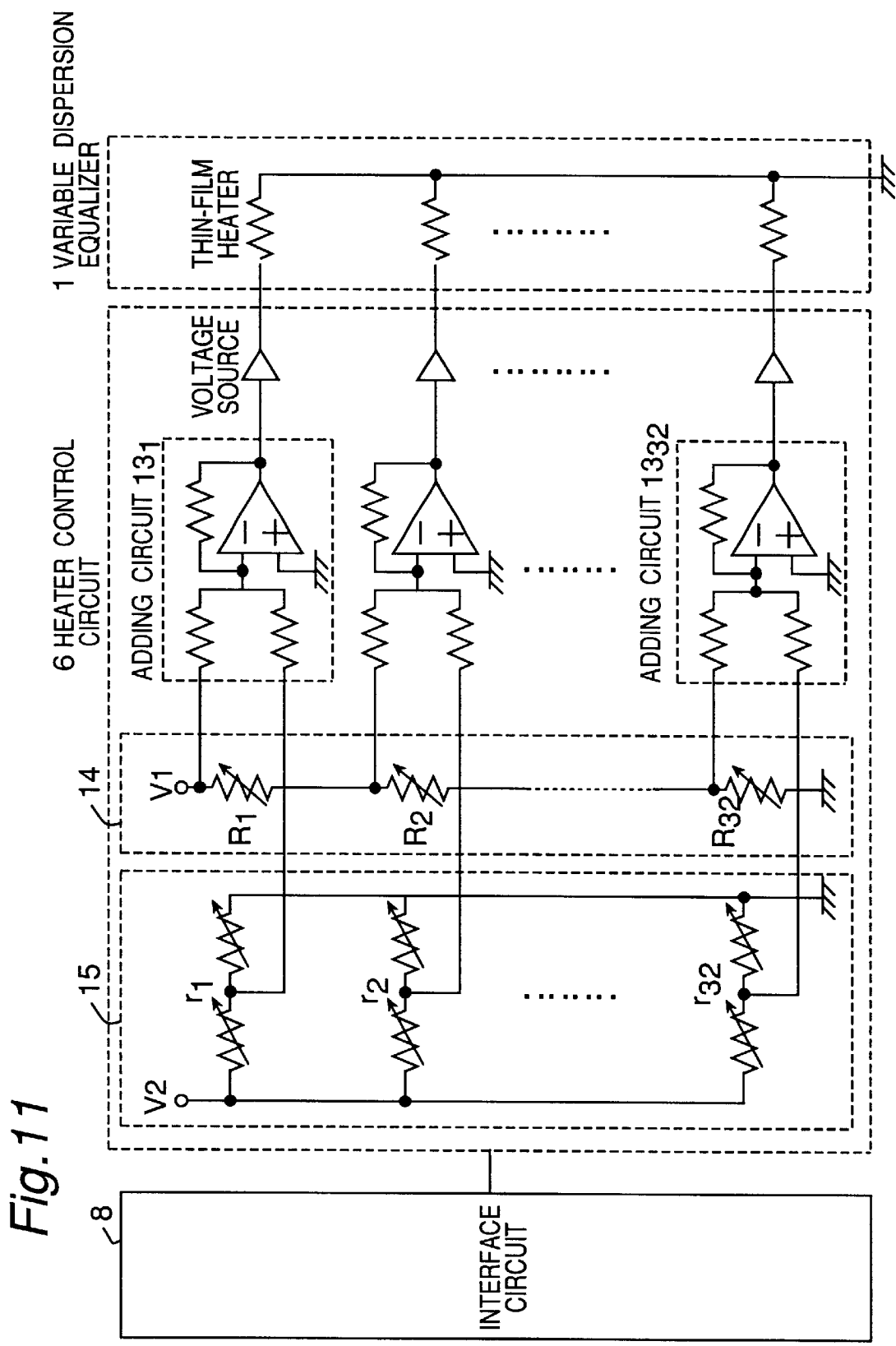
FIG. 11 is a block diagram showing the details of a heater control circuit in FIG. 10A.

In addition, the heater control circuit 6 is compared with the heater control circuit constituting the temperature control device for grating of the first embodiment, as shown in the block diagram in FIG. 11, the heater control circuit 6 is different from the heater control circuit in the first embodiment in that the heater control circuit 6 for supplying powers to 32 thin-film heaters are constituted by adding circuits $13_1$, $13_2$, $13_3$, ..., $13_{32}$ corresponding to the thin-film heaters $3_1$, $3_2$, ..., $3_{32}$, a first variable resistor group 14, and a second variable resistor group 15. The adding circuits $13_1$, $13_2$, $13_3$, ..., $13_{32}$ are connected to the thin-film heaters $3_1$, $3_2$, ..., $3_{32}$ through independent power sources, respectively. Current sources may be used in place of the power sources. The first variable resistor group 14 is obtained such that thirty two variable resistors are connected in series, and one end of each variable resistor is connected to an input terminal of each adding circuit. When the resistances of the variable resistors of the first variable resistor group 14 are adjusted, voltage ratios input to the adding circuits can be adjusted, and an entire voltage value can be changed by adjusting a voltage V1 applied to the first variable resistor group 14. On the other hand, the second variable resistor group 15 is obtained such that thirty two sets of two variable resistors connected in series with each other are connected to each other in parallel, each set of two variable resistors is connected to the other input terminal of each of the adding circuits 13. In this case, the resistances of the variable resistors of the second variable resistor group 15 are adjusted, so that the voltage ratios input to the adding circuits can be adjusted. An entire voltage value can be changed by adjusting a voltage V2 applied to the second variable resistor group 15. As described above, the configuration of the first variable resistor group 14 is different from the configuration of the second variable resistor group 15. However, even though the second variable resistor group 15 is used in place of the first variable resistor group 14, the same operations as described above can be performed.

Figure 12A:
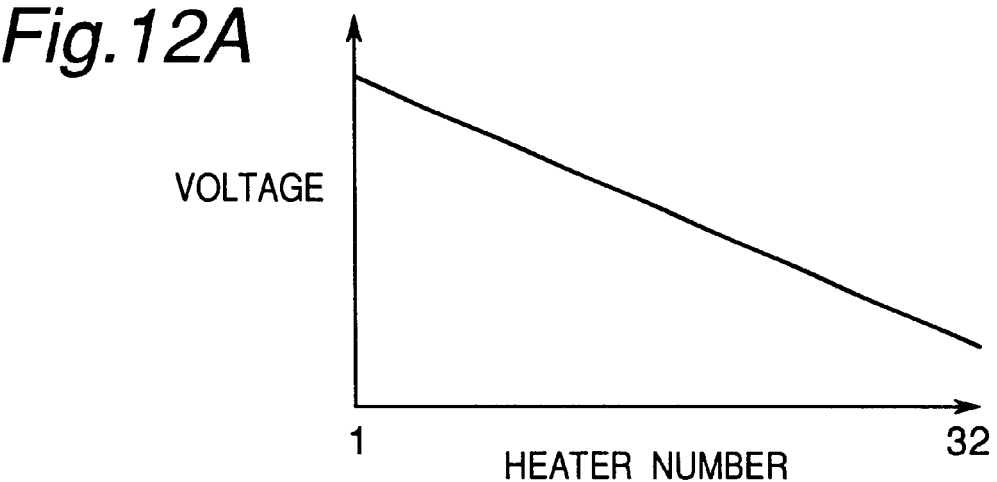
FIG. 12A is a graph showing a distribution of a control voltage applied to a heater by a first variable resistor group.
Figure 12B:
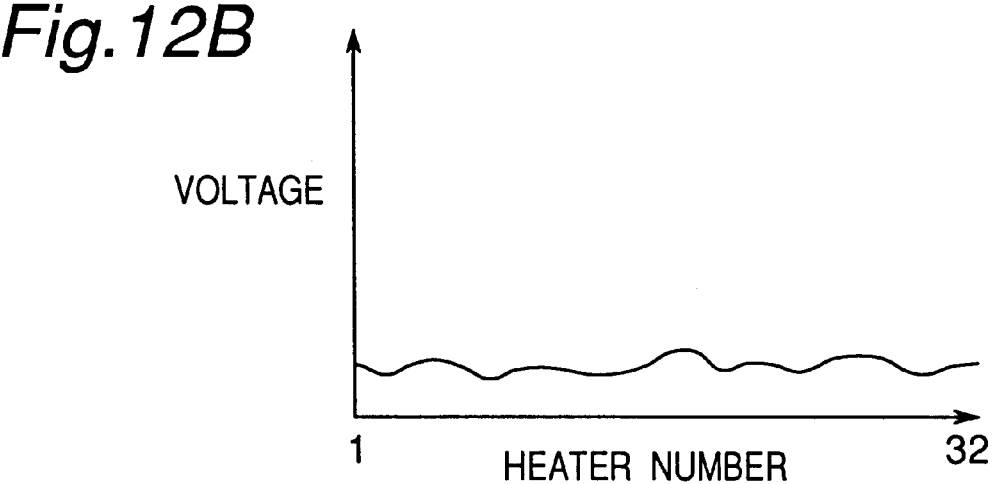
FIG. 12B is a graph showing a distribution of a control voltage applied to a heater by a second variable resistor group.
Figure 12C:
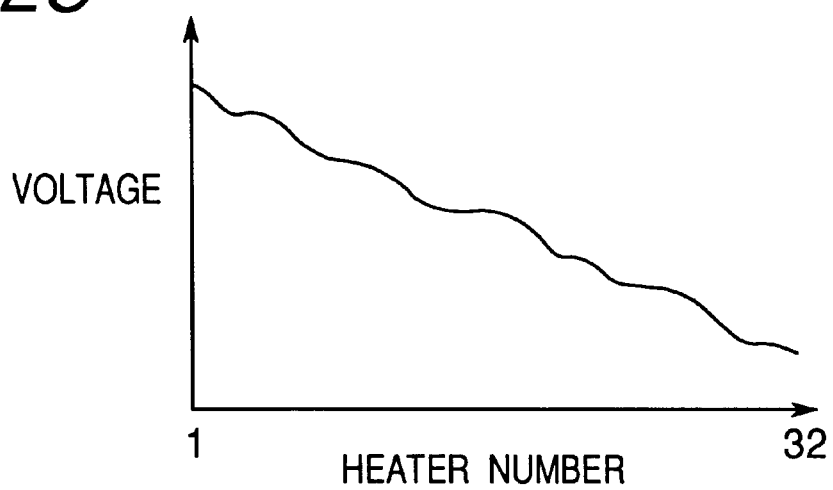
FIG. 12C is a graph showing a control voltage distribution obtained after the control voltages of FIGS. 12A and 12B are added to each other.

The operation of the temperature control device for grating will be described below. From the block diagram shown in FIG. 11, when the resistances of the first variable resistor group 14 are equal to each other, by partial voltages of the voltage of the simple series resistors, as shown in FIG. 12A, a voltage which decreases at a linearly functional rate. On the other hand, when the resistance ratios of the two resistors connected in series with each other are arbitrarily adjusted in the second variable resistor group 15, voltage values having arbitrary ratios are input to the adding circuits 13 for the heaters as shown in FIG. 12B. These voltage values are added to each other by the adding circuits 13 for the heaters, and each of output voltages is expressed by FIG. 12C. The output voltages from the adding circuits are applied to the thin-film heaters $3_1$, $3_2$, ..., $3_{32}$ of the variable dispersion equalizer 1 by a voltage source with a distribution shown in FIG. 12C. In this manner, the temperature distributions of the thin-film heaters can be changed depending on the powers applied to the thin-film heaters. In this case, the first variable resistor group 14 is to obtain linearly functional voltage distributions. When the applied voltage V1 to the first variable resistor group 14 is changed, the dispersion of the variable dispersion equalizer 1 can be changed. Note that a current source may be used in place of the voltage source to convert a voltage into a current and to apply the current.

The temperatures of the thin-film heaters change depending on the powers of the thin-film heaters. Exactly, the voltage distributions output from the first variable resistor group 14 are preferably square roots, i.e., the squares of the voltages are preferably linearly functional. Such a voltage distribution is converted so that the voltage source makes the square of the voltage linearly functional. A current source may be used in place of the voltage source to perform conversion such that the square of the current is linearly functional. On the other hand, a voltage distribution for correcting a group delay ripple can be given by the second variable resistor group 15. For example, by ununiformity of the core width and the refractive index of the optical waveguide formed in the PLC and ununiformity of an irradiation amount of an ultraviolet laser beam in manufacturing a grating, ununiformity of the equivalent refractive index $N_{eff}$ occurs. By the ununiformity of the equivalent refractive index $N_{eff}$, a group delay ripple is generated. For this reason, in order to correct the group delay ripple, a voltage distribution which corrects the ununiformity of the equivalent refractive index can be given. When an output voltage distribution of the second variable resistor group 15 is a voltage distribution in which the temperature distributions of the heaters are quadratically functional voltage distributions as shown in the graph in FIG. 5A, a dispersion slope can be made variable. In this manner, when the applied voltage V2 of the second variable resistor group 15 is made variable, the dispersion slope can be made variable. When the voltages V1 and V2 applied to the first variable resistor group 14 and the second variable resistor group 15 are independently controlled, the dispersion and the dispersion slope can be independently changed. Signals for controlling the voltages V1 and V2 depending on the dispersion and the dispersion slope set by a user may be transmitted from the interface circuit 8. The voltages V1 and V2 may be directly supplied from the interface circuit 8. In addition, a variable resistance and the applied voltage V2 for correcting the ununiformity of the equivalent refractive index may be adjusted and fixed in advance, or a configuration in which the variable resistance and the applied voltage V2 can be adjusted may be employed.

In this temperature control device for grating, as variable resistor groups, two variable resistor groups, i.e., the first variable resistor group 14 and the second variable resistor group 15 are used. A function of making a dispersion variable is given to one of the first variable resistor group 14 and the second variable resistor group 15, and a function of correcting a group delay ripple or making a dispersion slope variable is given to the other. However, the temperature control device for grating is not limited to this configuration. In addition, as adjustment of variable resistors of the variable resistor groups, a method using a characteristic measuring device and a computer 23 in the variable dispersion equalizer 1 such as a dispersion measuring device 22 as described in the first embodiment can be used. In this case, in place of a ROM writing device 24, a variable resistor adjusting device for automatically adjusting variable resistors is used.

The principle that correction of a group delay ripple caused by ununiformity of an equivalent refractive index is corrected will be described below. Since the equivalent refractive index $N_{eff}$ is determined by an interaction between a propagated optical wave and the core 10, the cladding 11, ununiformity of an equivalent refractive index is caused by ununiformity of the core width of an optical waveguide and ununiformity of the refractive indexes of the core 10 and the cladding 11, the ununiformity occurs in the PLC easier than in the optical fiber in the manufacturing processes. In addition, since an amount of change in refractive index is determined by an amount of ultraviolet irradiation in manufacturing a grating, ununiformity of the equivalent refractive index is also caused by uniformity of the amount of ultraviolet irradiation in manufacturing grating. The wavelength of a light component reflected by the grating is expressed by the following Equation 2. Note that Equation 2 is the same as Equation 1.

$$\lambda_B = 2N_{eff}\Lambda \quad \text{[Equation 2]}$$

In this equation, the wavelength $\lambda_B$ of a light component reflected at a length l of the grating in the longitudinal direction is expressed by the following Equation 3. Note that $N_{eff}(l)$ and $\Lambda(l)$ are an equivalent refractive index and a grating pitch at a position l in the chirp grating 12, respectively.

$$\lambda_B(l) = 2N_{eff}(l)\Lambda(l) \quad \text{[Equation 3]}$$

In this equation, when the equivalent refractive index $N_{eff}(l)$ has ununiformity depending on the position l of the chirp grating 12, the equivalent refractive index $N_{eff}(l)$ can be expressed as a value $N_{const}$ which is constant in the entire grating and a difference $\Delta N_{eff}(l)$ between the equivalent refractive index $N_{eff}(l)$ and the value $N_{const}$. Therefore, Equation 3 can be expressed by the following Equation 4:

$$\lambda_B(l) = 2\{N_{const} + \Delta N_{eff}(l)\}\Lambda(l) \quad \text{[Equation 4]}$$

As described above, the equivalent refractive index is changed by the temperature, the change of the equivalent refractive index obtained when a change in temperature is set at the position l of the grating is represented by $\Delta N_t(l)$, Equation 4 is expressed by Equation 5.

$$\lambda_B(l) = 2\{N_{const} + \Delta N_{eff}(l) + \Delta N_t(l)\}\Lambda(l) \quad \text{[Equation 5]}$$

Figure 13A:
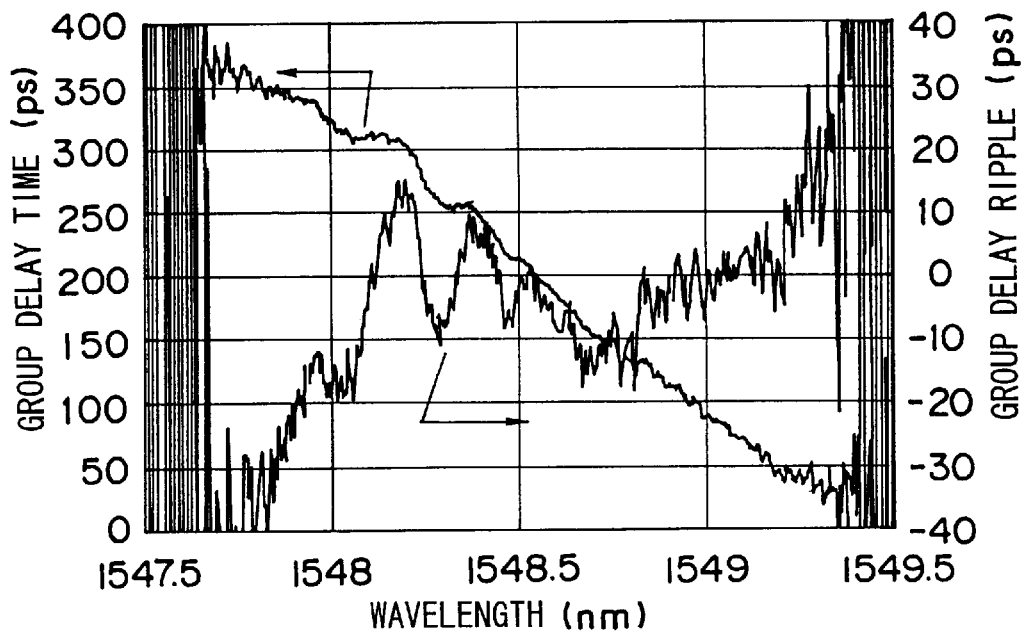
FIG. 13A is a graph showing the existence of a group delay ripple in a group delay time characteristic of a grating.
Figure 13B:
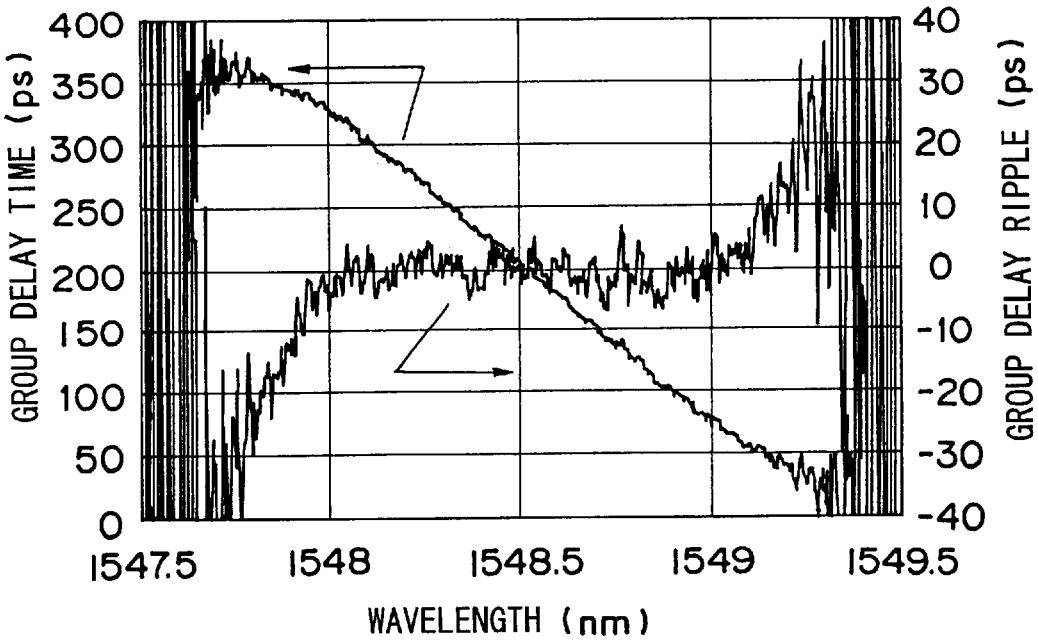
FIG. 13B is a graph showing a group delay time characteristic after the group delay ripple of the grating is corrected by the temperature control device of the third embodiment of the present invention.

Therefore, when a temperature distribution which satisfies $\Delta N_{eff}(l) + \Delta N_t(l)$ = constant is set to correct the ununiformity of the equivalent refractive index, and a group delay ripple can be reduced. In fact, the ununiformity of the equivalent refractive index cannot be easily measured, and a temperature distribution for correcting the ununiformity cannot be easily given. For this reason, while the group delay characteristic of the chirp grating is measured, a temperature for correcting the group delay characteristic, so that the group delay ripple can be corrected. For example, a group delay ripple as shown in FIG. 13A can be corrected as shown in FIG. 13B.

In the above case, a method using a plurality of variable resistors is used as a method of obtaining a linearly functional voltage distribution, a quadratically functional voltage distribution, and an arbitrary voltage distribution. However, the third embodiment is not limited to this method, and can use various means. In addition, although a voltage distribution and a voltage adding circuit are used, the third embodiment is not limited to this configuration. This embodiment may use a configuration in which a current distribution and a current adding circuit. Furthermore, the adding circuit 13 using an operational amplifier (ope-amplifier) is used as the adding circuit. However, the third embodiment is not limited to the adding circuit 13 using the operational amplifier. As a voltage source and a current source, arbitrary voltage or current sources, i.e., bipolar transistors, field effect transistors, and various amplifiers may be used. These circuit components can be reduced in size by integrating the circuit components as an integrated circuit.

The temperature control device for grating of the fourth embodiment differs from the temperature control device for grating of the third embodiment in the following points. That is, the number of input terminals of each adding circuit is set to be four, three variable resistor groups are connected to the three input terminals, and one constant voltage group is connected to the remaining input terminal. In addition, making a dispersion and a dispersion slope variable, correction of a group delay ripple, and addition of a bias can be independently performed. The number of input terminals of each adding circuit is set to be four in the temperature control device for grating. However, the number of input terminals is not limited to four, and three, five, or more input terminals may be used. Although the number of variable resistor groups is set to be three, four or more variable resistor groups may be used.

Figure 14:
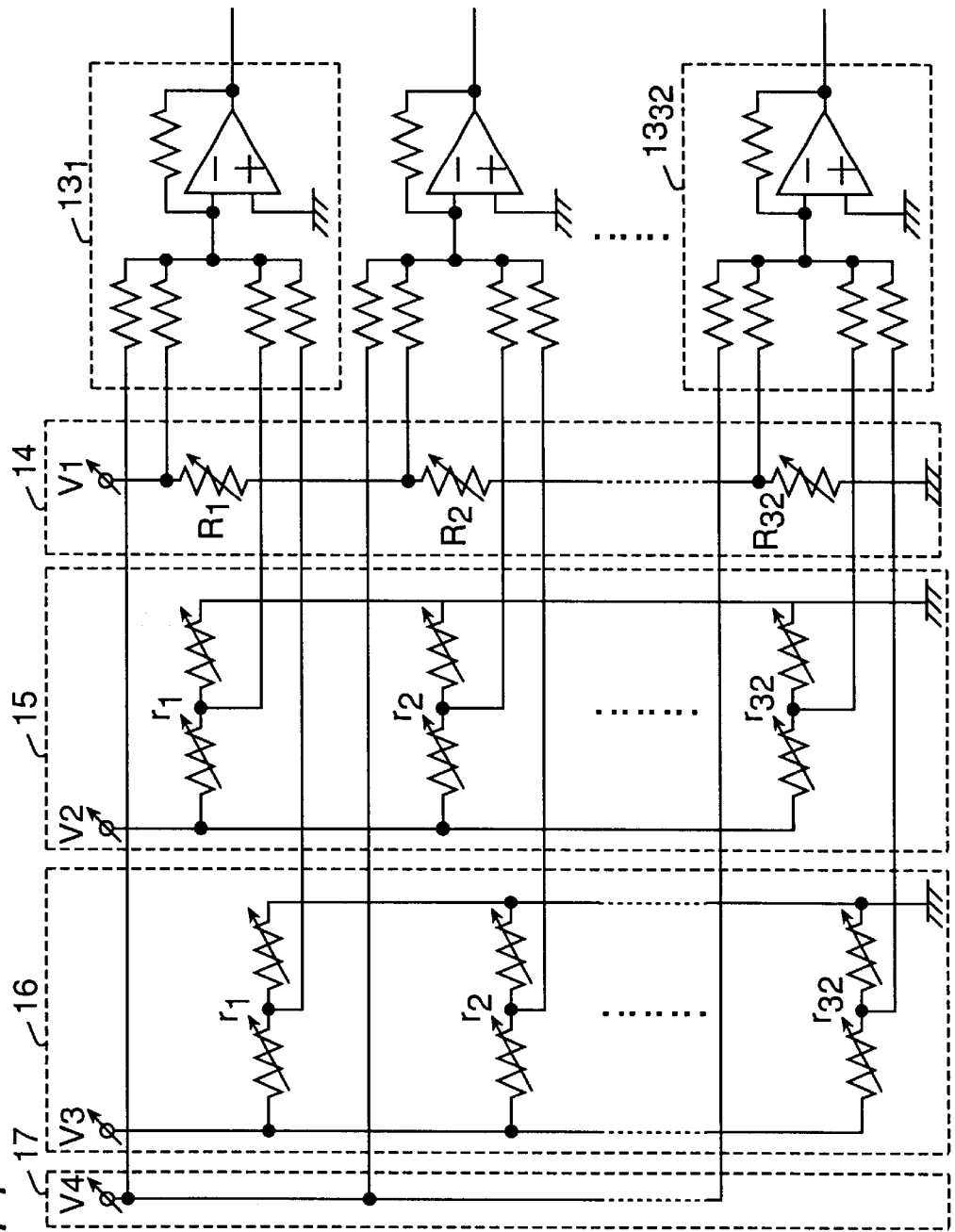
FIG. 14 is a block diagram showing the details of a heater control circuit of a temperature control device of the fourth embodiment of the present invention.

More specifically, a heater control circuit 6 includes, as shown in the block diagram in FIG. 14, in addition to a first variable resistor group 14 and a second variable resistor group 15, a third variable resistor group 16 and a constant voltage group 17. The constant voltages can be input to adding circuits 13 by the constant voltage group 17. For this reason, an entirely uniform change in temperature can be given to a grating, and operates as a bias for shifting the wavelength of a reflected light component as a whole. By the constant voltage group 17, with respect to a precision of about 10 pm which is necessary in an optical communication system, the heater control circuit 6 can be operated as an adjustment mechanism against a change in use environment.

A temperature control device for grating of the fifth embodiment of the present invention includes a photoelectric conversion unit for photoelectrically converting a reflected light component from a grating and an operation device for adjusting temperature variable device. Therefore, electric signals obtained after photoelectric conversion have values which are equal to or larger than a predetermined value. In this manner, dispersion equalization of an optical fiber transmission path can be optimized by automatic control.

Figure 15:
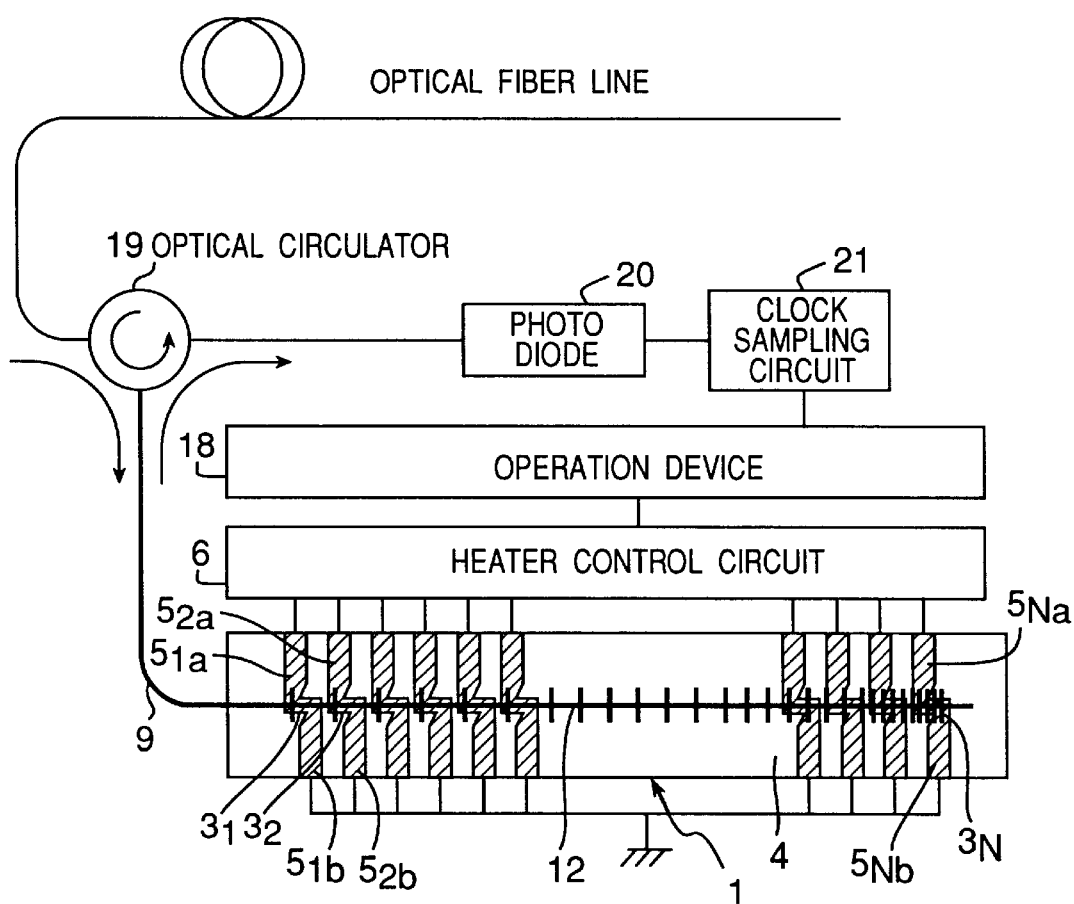
FIG. 15 is a block diagram showing the configuration of a temperature control device of the fifth embodiment of the present invention.

More specifically, as compared with the temperature control device for grating of the first embodiment, as shown in the block diagram in FIG. 15, the both differs from each other in that the temperature control device for grating includes a photodiode 20 serving as a photoelectric conversion unit for photoelectrically converting an output light component from a variable dispersion equalizer 1 for performing temperature control, a clock sampling circuit 21, and an operation device 18 for adjusting control signals to respective heaters. That is, in this temperature control device for grating, unlike the first embodiment, the heater control circuit 6 is not controlled by a control signal from a memory 7, a reflected light component from the grating is photoelectrically converted to sample a clock voltage. The heater control circuit 6 is automatically controlled by the operation device 18 such that the clock voltage is equal to or larger than a predetermined value.

Figure 16:
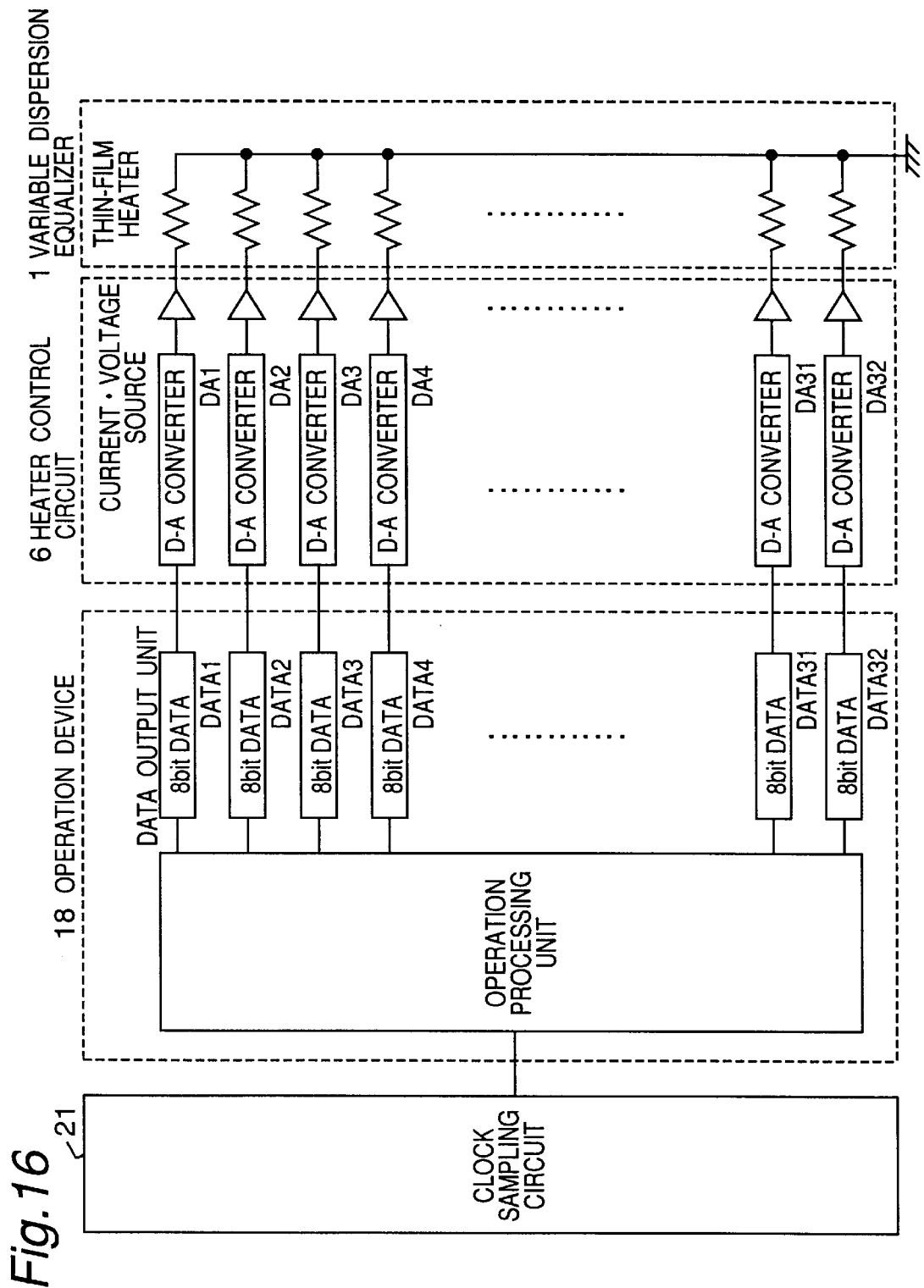
FIG. 16 is a block diagram of an automatic control system in FIG. 15.

The configuration of a control system constituted by the operation device 18, the heater control circuit 6, and the like of the temperature control device for grating will be described below with reference to the block diagram in FIG. 16. The operation device 18 is an operation device such as a microprocessor or a computer, and, as shown in FIG. 16, is constituted by an operation processing unit and a data output unit. Operation output units are connected to D-A converters DA1, DA2, . . . , DA32 of the heater control circuit 6, and output digital data DATA1 to DATA32. On the basis of the digital data DATA1 to DATA32, temperature distributions of thin-film heaters 3 are controlled. In the operation device 18, a clock component is sampled as a voltage from an optical signal output from the variable dispersion equalizer 1 by the clock sampling circuit 21, and the voltage is A-D-converted into digital data. The digital data is input to the operation processing unit of the operation device 18. As described above, one feedback system is formed.

Procedures of automatically optimizing dispersion equalization by the variable dispersion equalizer 1 for performing temperature control in the temperature control device for grating will be described below. As described above, an optical pulse propagated through an optical fiber transmission path is distorted by the influence of the dispersion of the optical fiber transmission path. This optical pulse is input to the variable dispersion equalizer 1 through an optical circulator 19, and subjected to dispersion equalization by the variable dispersion equalizer 1, and then output. An output light component is input to the photodiode 20 through the optical circulator 19 and photoelectrically converted into an electric signal. A clock component is sampled from the electric signal as a voltage by the clock sampling circuit 21 (S23). This voltage is maximum when synchronization of the clock component is correctly established. This case is a case in which dispersion equalization is optimized by the variable dispersion equalizer 1. Therefore, powers applied to the thin-film heaters of the variable dispersion equalizer 1 are controlled by the operation device 18 such that the clock voltage is maximum (procedures in S24 to S28). More specifically, a control signal for gradually increasing or decreasing the temperatures of the heaters are output from the operation processing unit of the operation device 18 through the data output unit (S25). A clock component is sampled from an optical signal passing through the variable dispersion equalizer 1 to which the temperature distribution is given on the basis of the control signal (S26), and the clock component is compared with the clock component obtained before the temperatures of the heaters are increased or decreased (S27), so that the directivities of the optimum temperatures of the thin-film heaters are determined. Repeating the series of feed back control operations, the thin-film heaters 3 of the variable dispersion equalizer 1 are controlled to have optimum temperatures. In this manner, when a temperature distribution given to the grating is controlled by the thin-film heaters, optimization of dispersion equalization can be automatically controlled without a user to be specially conscious of a dispersion, a dispersion slope, and a group delay ripple.

Figure 17:
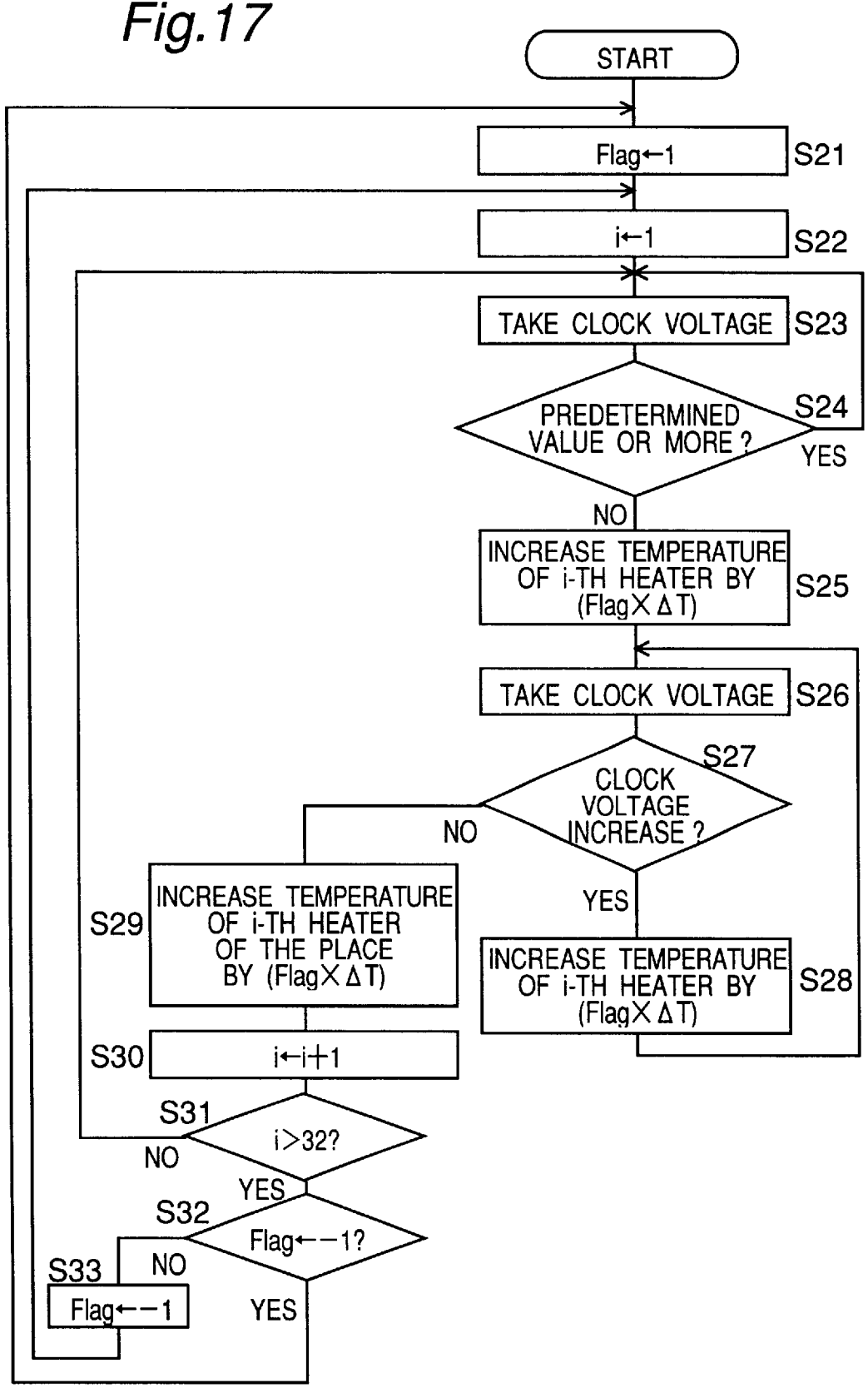
FIG. 17 is a flowchart when the temperature control device of the fifth embodiment of the present invention.

Still more specifically, a method of automatically controlling the temperature control device for grating will be described below with reference to the flowchart in FIG. 17. A Flag is set to be 1 (S21), and heater number i is set to be 1 (S22). A clock voltage is acquired into the temperature control device (S23), and it is decided the clock voltage is equal to or larger than a predetermined voltage or not (S24). If the clock voltage is equal to or larger than the predetermined voltage, the dispersion equalization performed by the variable dispersion equalizer 1 is optimized. For this reason, the temperature distribution need not be especially changed, and the procedures in S23 and S24 are repeated. On the other hand, if the clock voltage is smaller than the predetermined voltage, the heater temperature corresponding to heater number i is increased by (Flag×ΔT) (S25). Thereafter, the clock voltage is taken into the temperature control device (S26), and the clock voltage is compared with an immediately previous clock voltage (S27). If the clock voltage is larger than the immediately previous clock voltage, the heater temperature of heater number i is further increased (S28). The heater temperature is repeatedly increased until the clock voltage is equal to or smaller than the immediately previous clock voltage. In this case, if the clock voltage is smaller than the immediately previous clock voltage, the heater temperature is returned to an immediately previous heater temperature (S29). This operation is performed to adjust the clock voltages of the heaters to maximum voltages. Thereafter, heater number i is incremented (S30), the same procedures as described above are repeated until the 32nd heater (S31). When the procedures are repeated until the 32nd heater, it is decided whether the Flag is −1 or not (S32). If the Flag is not −1, −1 is set (S33), the same procedures described above are repeated from the first heater (S22). The Flag means that the heater temperatures are adjusted to increase the heater temperatures (Flag=1) and to decrease the heater temperatures (Flag=−1) so as to maximize the clock voltages of the respective heaters. When the Flag is −1, 1 is set in the Flag (S21), the procedures described above are repeated. Since the procedures are automatically controlled, the end of the procedures is not especially defined. The procedures may be appropriately ended such that a new setting is decided.

In this embodiment, although the configuration and the operation are used, the operation device 18, the operation processing method, and an sampling component from an optical signal are not limited to the configuration and the operation. However, the following configuration and operation may be used. That is, an optical signal characteristic passing through the variable dispersion equalizer 1 can be processed by the operation device and fed back to control the powers of the heaters.

In a variable dispersion equalizer of the sixth embodiment of the present invention, a plurality of temperature variable device disposed near a grating are arranged at a numeral distribution of the temperature variable device defined by a grating pitch $\Lambda(l)$ which is a function of a length l of the grating in the longitudinal direction and an equivalent refractive index $N_{\it{eff}}(l)$. More specifically, an amount of chirp $2\Delta$ which is twice a difference $\Delta$ per unit length between products $\Delta \cdot N_{\it{eff}}$ of the grating pitch $\Lambda$ and the equivalent refractive index $N_{\it{eff}}$ is expressed by the following Equation 6:

$$2\Delta = 2N_{\it{eff.long}}\Lambda_{long} - 2N_{\it{eff.short}}\Lambda_{short} \quad \text{[Equation 6]}$$

In this equation, $N_{\it{eff\ long}}$ and $N_{\it{eff\ short}}$ represent equivalent refractive indexes of two points spaced apart from each other by 1 cm, and $\Lambda_{long}$ and $\Lambda_{short}$ are grating pitches of two points spaced apart from each other by 1 cm. $N_{\it{eff\ long}}$ and $\Lambda_{long}$ represent values of the same point, and $N_{\it{eff\ short}}$ and $\Lambda_{short}$ represent values of the same points. At this time, a plurality of temperature variable device are arranged to satisfy the condition of a numeral distribution n (the number of temperature variable device/unit length) per unit length of Equation 7 (to be described below):

$$n \geq \frac{2\Delta}{0.1} \quad \text{[Equation 7]}$$

When the plurality of temperature variable device are arranged at the numeral distribution, a group delay ripple of a reflected light component of a grating can be reduced, and the cycle of the group delay ripple can be reduced. A transmission characteristic can be prevented from degraded.

Figure 20A:
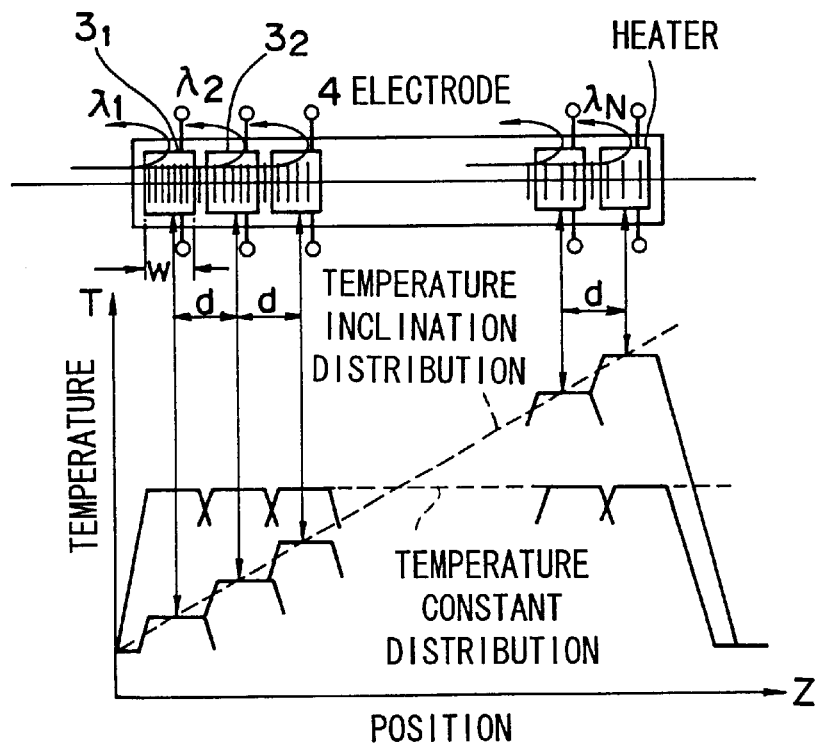
FIG. 20A includes an upper view of heaters arranged around a prior art grating and a graph showing distributions of temperatures given to the grating by the heaters.
Figure 20B:
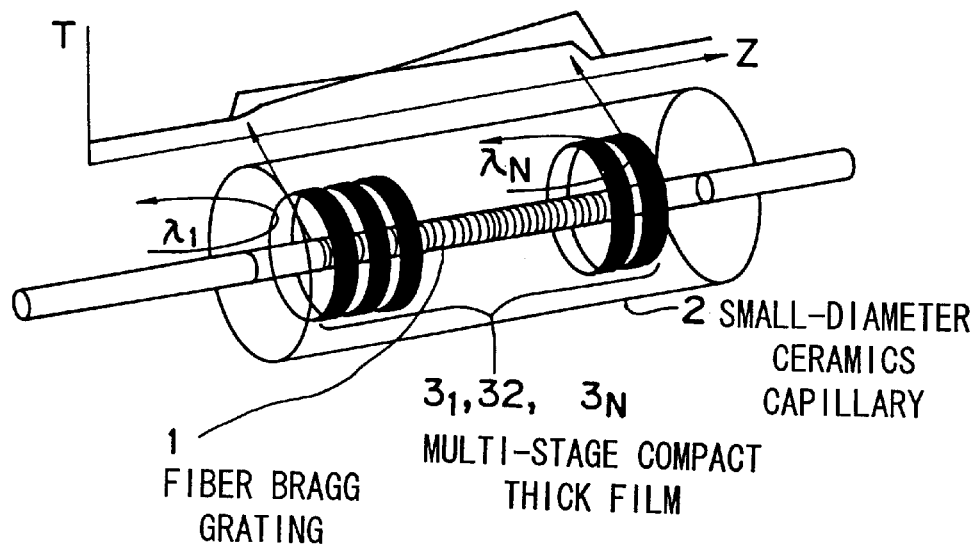
FIG. 20B is a perspective view showing an arrangement of prior art heaters.

More specifically, this variable dispersion equalizer is different from a variable distribution equalizer used in each of the above embodiments described above in that the heaters disposed near the grating of an optical waveguide to be constituted are arranged at the numeral distribution defined by the grating pitch $\Lambda$ and the equivalent refractive index. More specifically, the number of heaters disposed near the grating of the optical waveguide constituting the variable dispersion equalizer used in each of the embodiments described above is fixed to 32. If the number of heaters disposed near the grating is not appropriate, a group delay ripple which degrades a transmission characteristic is generated. For example, a plurality of heaters are disposed near the grating, a temperature distribution in one heater is almost uniform. If different temperatures are given to the heaters, the temperature distributions are directly transmitted to the grating. For this reason, a step-formed temperature distribution as in the case of a conventional variable dispersion equalizer in FIG. 20A. If the step-formed temperature distribution exists, a change in equivalent refractive index caused by a chirp grating is step-formed, and a group delay ripple is generated. It is known that the group delay ripple has various cycles and gives different influences depending on a bit rate of an optical communication system to be used. At a bit rate of 40 Gbit/s or more which maximally requires the variable dispersion equalizer, a group delay ripple having a cycle of, especially, 0.1 nm or more considerably influences the transmission characteristic.

Figure 18:
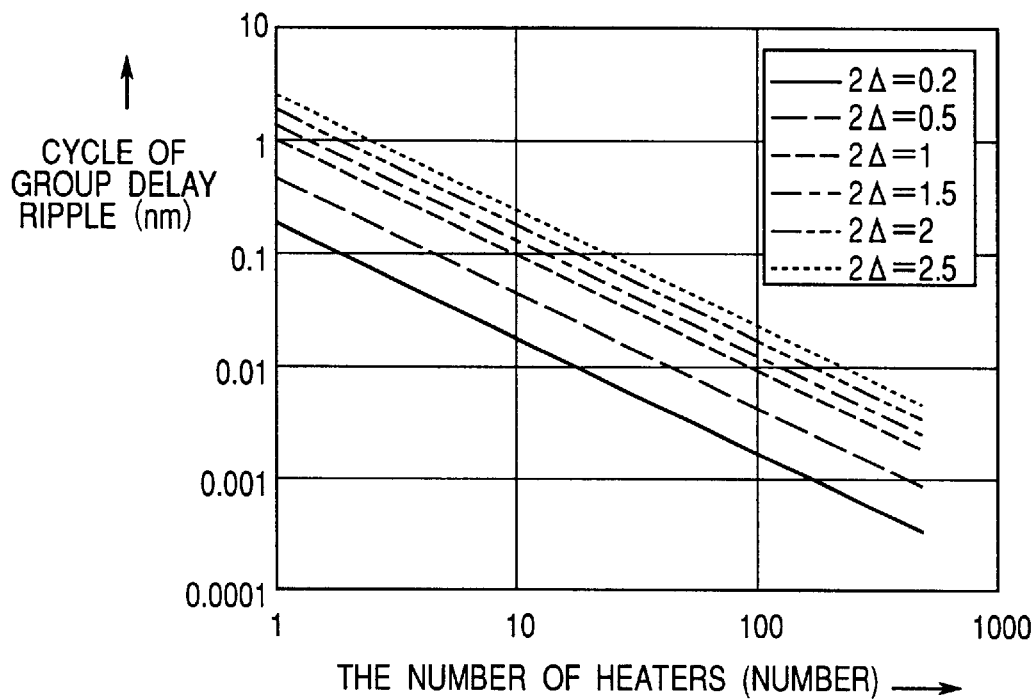
FIG. 18 is a graph showing the relationship between the number of heaters per 1-cm grating of a variable dispersion equalizer and a cycle of a group delay ripple.
Figure 19:
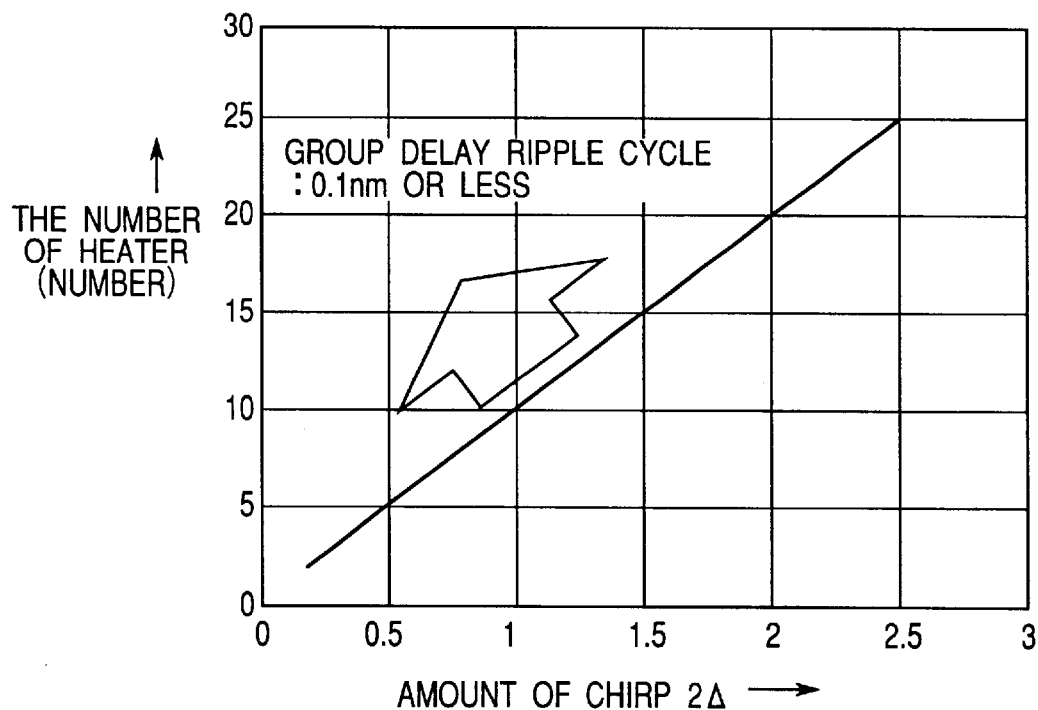
FIG. 19 is a graph showing an allowable range of the number of heaters arranged per 1-cm grating of a variable dispersion equalizer of the sixth embodiment of the present invention.

Since the group delay ripple is caused by a step-formed temperature distribution obtained by the heaters, when a numeral distribution of the heaters disposed near the grating is changed, as shown in FIG. 18, the cycle of the group delay ripple changes. In this case, changing an amount of chirp $2\Delta$ which is twice a difference $\Delta$ per unit length between products $\Lambda \cdot N_{\it{eff}}$ of the grating pitch $\Lambda$ and the equivalent refractive index $N_{\it{eff}}$, the cycle of the group delay ripple more changes. Therefore, when heaters are arranged near the grating at an appropriate numeral distribution, the cycle of the group delay ripple can be set to be a cycle having a small influence. More specifically, as shown in FIG. 19, when the amount of chirp $2\Delta$ per 1 cm of the grating is set as a parameter, a case in which the cycle of the group delay ripple is 0.1 nm is indicated by a straight line. Therefore, a region above this straight line is a region in which the cycle of the group delay ripple is 0.1 nm or less. This is expressed by an equation, the relationship expressed by the following Equation 8 is obtained:

$$n \geq \frac{2\Delta}{0.1} \quad \text{[Equation 8]}$$

Therefore, when the heaters are arranged at a numeral distribution which satisfies Equation 8 to reduce the cycle of the group delay ripple, and an influence on an optical signal having a bit rate of 40 Gbit/s or more can be suppressed.

What is claimed is:

1. A temperature control device for controlling temperature distribution of a grating of a variable dispersion equalizer, the temperature control device comprising:

a controller for controlling temperatures of a plurality of electrical heaters with respective control signals to produce a plurality of temperature distribution patterns of the grating, each temperature distribution pattern being a respective combination of the control signals for the heaters; and a storage device in which a plurality of the temperature distribution patterns and the respective combinations of the control signals producing the temperature distribution patterns are stored, wherein the controller controls the heaters with the control signals for a temperature distribution pattern selected from the storage device.

2. The temperature control device according to claim 1, including storing the plurality of temperature distribution patterns produced by combinations of the control signals for controlling the plurality of heaters in the storage device by:

applying initial control signals to the heaters so that a group delay time of the grating has a predetermined group delay;

measuring the group delay time of the grating and comparing the group delay time measured with the predetermined group delay time;

correcting the initial control signal such that a group delay ripple, which is a difference between the group delay time measured and the predetermined group delay time, is not more than an allowable value to calculate a corrected control signal;

applying the corrected control signal to the respective heaters;

storing a combination of the corrected control signal applied to the respective heaters and the measured group delay time in the storage device; and repeating the foregoing steps and storing the plurality of temperature control patterns in the storage device.

3. The temperature control device according to claim 1, including storing the plurality of temperature distribution patterns of combinations of control signals for controlling the plurality of heaters in the storage device by:

calculating an initial control signal applied to the temperature variable devices to produce a predetermined group delay time of the grating;

applying the initial control signal to the respective heaters;

measuring the group delay time of the grating to compare the group delay time measured with the predetermined group delay time;

obtaining the predetermined group delay time when a group delay ripple, which is a difference between the group delay time measured and the predetermined group delay time, is large, and performing, at least once:

calculating a corrected control signal applied to the heaters;

applying the corrected control signal to the respective heaters; and measuring the group delay time of the grating to compare the group delay time measured with the predetermined group delay time;

storing a combination of the corrected control signal applied to the respective heaters and the group delay time measured in the storage device when the ripple is within an allowable range, and repeating the foregoing steps and storing the plurality of temperature control patterns in the storage device.

4. A temperature control device for controlling temperature distribution of a grating of a variable dispersion equalizer, the temperature control device comprising:

a controller for controlling temperatures of a plurality of electrical heaters with respective control signals to produce a plurality of temperature distribution patterns of the grating, each temperature distribution pattern being a respective combination of the control signals for the heaters;

first and second control signal setting devices independently setting first and second variable control signals applied to the plurality of heaters; and a signal adding device for adding the first and second control signals supplied by the respective control signal setting devices to produce respective summed control signals, and transmitting the summed control signals to the respective heaters, providing independent control of the heaters for each of two variables related to the first and second control signals.

5. The temperature control device according to claim 4, wherein the first and second control signals independently control, through the plurality of heaters, dispersion and dispersion slope of the grating.

6. The temperature control device according to claim 4, including a third control signal setting device for canceling group delay ripple of the grating.

7. The temperature control device according to claim 4, including a third control signal setting device for applying a constant bias temperature to the grating.

8. The temperature control device according to claim 4, wherein the first and second control signal setting devices comprise respective groups of variable resistors.

9. The temperature control device according to claim 4, further comprising a storage device which stores a plurality of temperature distribution patterns produced by combinations of the control signals for the heaters, and wherein the first and second control signal setting devices are set by the control signals of at least one of the temperature control patterns selected from the storage device.

10. A temperature control device for controlling temperature distribution of a grating of a variable dispersion equalizer, the temperature control device comprising:

a controller for controlling temperatures of a plurality of electrical heaters with respective control signals to produce a plurality of temperature distribution patterns of the grating, each temperature distribution pattern being a respective combination of the control signals for the heaters;

a photoelectric conversion unit for photoelectrically converting an optical signal, reflected by the grating of the optical waveguide, into an electrical signal; and an operation device for comparing the electrical signal with a predetermined value to produce a difference signal and for controlling electrical power applied to a respective heater in response to the difference signal so that the electrical signal is changed to become not less than the predetermined value.

11. The temperature control device according to claim 10, wherein the electrical signal is a clock voltage.

12. A method of automatically controlling a temperature control device for independently controlling each of a plurality of heaters which are disposed near a grating of a variable dispersion equalizer for an optical waveguide, the method comprising:

converting an optical signal reflected by the grating into an electrical signal;

comparing the electrical signal with a predetermined value;

adjusting a control signal applied to the respective heaters such that the electrical signal becomes a value which is not less than the predetermined value; and controlling the respective heaters with the control signal.

13. The method according to claim 12, wherein the electrical signal is a clock voltage, and the converting comprises:

acquiring the clock voltage for each of a plurality of time periods;

comparing the clock voltage with a threshold voltage;

changing voltages of the heaters such that the clock voltage is maximum when the clock voltage is not higher than the threshold voltage, and at least once, changing the voltages of the respective heaters by a predetermined value; and comparing clock voltages with each other before and after changing the voltages.

14. A variable dispersion equalizer comprising:

an optical waveguide; and a plurality of heaters disposed near a grating and independently controlled with respect to temperature, wherein the plurality of heaters are arranged in a distribution defined by a grating pitch $\Lambda(l)$ which is a function of length l of the grating in a longitudinal direction of the optical waveguide and of an equivalent refractive index $N_{eff}(l)$, with n heaters per unit length in the longitudinal direction of the optical waveguide so that the distribution satisfies $n \geq 2\Delta/0.1$ and $\Delta$ is a difference between $\Lambda$ $N_{eff}$ per unit length in the longitudinal direction of the optical waveguide.

15. The variable dispersion equalizer according to claim 14, wherein the grating is a chirped grating in which the grating pitch varies in the longitudinal direction of the optical waveguide.

* * * * *